(12) United States Patent
Bilandi et al.

(10) Patent No.: US 8,405,721 B2
(45) Date of Patent: Mar. 26, 2013

(54) METHOD, SYSTEM AND APPARATUS FOR MONITORING LOADING OF A PAYLOAD INTO A LOAD CARRYING CONTAINER

(75) Inventors: Shahram Tafazoli Bilandi, Vancouver (CA); Farshid Tafazoli Bilandi, Vancouver (CA); Arya Ohadi Esfahani, Vancouver (CA)

(73) Assignee: Motion Metrics International Corp., Vancouver, BC (CA)

( * ) Notice: Subject to any disclaimer, the term of this patent is extended or adjusted under 35 U.S.C. 154(b) by 594 days.

(21) Appl. No.: 12/588,615

(22) Filed: Oct. 21, 2009

(65) Prior Publication Data
US 2010/0110185 A1 May 6, 2010

Related U.S. Application Data

(60) Provisional application No. 61/193,001, filed on Oct. 21, 2008.

(51) Int. Cl.
*H04N 9/47* (2006.01)

(52) U.S. Cl. ............ 348/143; 706/52; 702/174
(58) Field of Classification Search .......... 348/143; 706/52; 702/174
See application file for complete search history.

(56) References Cited

U.S. PATENT DOCUMENTS

| | | | |
|---|---|---|---|
| 5,160,055 A | 11/1992 | Gray | |
| 5,445,282 A | 8/1995 | Erikkila | |
| 5,539,516 A | 7/1996 | Heinrich et al. | |
| 5,729,339 A | 3/1998 | Park et al. | |
| 6,028,432 A | 2/2000 | Doemens et al. | |
| 6,223,110 B1 | 4/2001 | Rowe et al. | |
| 6,363,173 B1 | 3/2002 | Stentz et al. | |
| 6,363,632 B1 | 4/2002 | Stentz et al. | |
| 6,496,766 B1 | 12/2002 | Bernold et al. | |
| 6,536,615 B2 | 3/2003 | Nishikino et al. | |
| 6,768,931 B2 * | 7/2004 | Takehara et al. | 700/225 |
| 6,843,383 B2 | 1/2005 | Schneider et al. | |
| 6,894,621 B2 | 5/2005 | Shaw | |
| 6,985,085 B1 | 1/2006 | Brown | |
| 7,079,931 B2 | 7/2006 | Sahm et al. | |
| 7,489,098 B2 | 2/2009 | Harris et al. | |
| 7,490,728 B2 | 2/2009 | Schobesberger | |
| 7,656,459 B2 * | 2/2010 | Catanzaro | 348/372 |
| 2006/0208169 A1 * | 9/2006 | Breed et al. | 250/221 |
| 2008/0047170 A1 | 2/2008 | Nichols | |
| 2009/0112472 A1 | 4/2009 | Montgomery | |
| 2010/0052684 A1 | 3/2010 | Fling et al. | |

FOREIGN PATENT DOCUMENTS

| | | |
|---|---|---|
| WO | 2009095577 A1 | 8/2009 |
| WO | 2009121122 A1 | 10/2009 |

* cited by examiner

*Primary Examiner* — Yves Dalencourt

(57) ABSTRACT

A method, apparatus and system for monitoring loading of a payload into a load carrying container is disclosed. The method involves acquiring at least one image of a load transfer container during operation of the load transfer container by a first operator to load the payload into the load carrying container, and wirelessly transmitting an image signal representing the at least one image. The method also involves receiving the image signal and producing a display signal for causing the at least one image to be displayed for viewing by a second operator to facilitate monitoring of the loading of the payload.

37 Claims, 11 Drawing Sheets

METHOD, SYSTEM AND APPARATUS FOR MONITORING LOADING OF A PAYLOAD INTO A LOAD CARRYING CONTAINER

RELATED APPLICATIONS

This application claims the benefit of provisional patent application U.S. 61/193,001 entitled "METHOD, SYSTEM AND APPARATUS FOR MONITORING LOADING OF A PAYLOAD INTO A LOAD CARRYING CONTAINER" filed on Oct. 21, 2008 and incorporated herein by reference in its entirety.

BACKGROUND OF THE INVENTION

1. Field of Invention

This invention relates generally to methods and apparatus for monitoring loading operations and more particularly to producing and transmitting an image signal representing at least one image of a load carrying container to facilitate monitoring of loading of a payload.

2. Description of Related Art

Loading of bulk materials into a load carrying container for transport generally involves the use of loading equipment for transferring the bulk material payload from a source or storage location into the load carrying container. The load carrying container generally includes a container for transporting the payload having an opening for receiving the payload. Examples of load carrying containers include, but are not limited to, trucks, ships, and railroad cars having open box containers, closable box containers, or flatbed loading platforms. The loading equipment generally includes a load transfer container for transferring the payload and may include machines having a hydraulically operated or cable operated bucket for transferring the payload, cranes, forklift trucks, etc.

Loading operations generally involve at least some element of danger as the payload being transferred may be heavy and could cause severe injury to operators involved in the loading operation. Accordingly there exists a need to provide for efficient monitoring of loading operations by involved operators to ensure that safe loading practices are followed and that any loading equipment malfunction or damage is quickly identified.

Additionally, the payload may include undesired materials such as metals or other detritus that should not be loaded. Excavation sites may have old sections of pipe and other undesired material or detritus previously dumped or left at the site. Such undesirable materials in the payload may potentially cause equipment damage during loading or during later processing of the payload.

In mining operations, due to the large size and capital cost of equipment involved in loading mined ore, monitoring of loading operations is particularly important. Open pit mines in particular employ extremely large mining shovels, excavators, or loaders for loading ore payload into equally large open box haul trucks. In some examples of mining shovels, the bucket has capacity for loads of 150 tons or more.

There remains a need for methods and systems for monitoring loading operations to ensure safe and/or efficient operation of the involved equipment.

SUMMARY OF THE INVENTION

In accordance with one aspect of the invention there is provided a method for monitoring loading of a payload into a load carrying container. The method involves acquiring at least one image of a load transfer container during operation of the load transfer container by a first operator to load the payload into the load carrying container. The method also involves wirelessly transmitting an image signal representing the at least one image to permit reception and display of the at least one image for viewing by a second operator to facilitate monitoring of the loading of the payload.

The method may involve receiving an annunciation alerting the first operator to a loading condition observed by the second operator.

Receiving the annunciation may involve receiving a wirelessly transmitted annunciation of the loading condition.

Receiving the wirelessly transmitted annunciation may involve receiving an annunciation signal at a receiver associated with the load transfer container, the annunciation signal being produced in response to a vocal alert uttered by the second operator.

Receiving the annunciation signal may involve receiving a relayed annunciation signal from a dispatch center.

Receiving the wireless annunciation may involve establishing a two-way radio link between the first and second operators to permit voice communication between the first and second operators for alerting the first operator to the loading condition.

Receiving the wireless annunciation may involve receiving an annunciation of at least one of a structural condition of the load transfer container, a hazard associated with the loading of the payload into the load carrying container, an indication that a payload portion in the load transfer container exceeds a safe loading size, an indication that a payload portion in the load transfer container includes undesired materials or detritus, an indication of a non-uniform loading condition occurring in the load carrying container, and an indication that the loading operation should be discontinued.

Acquiring the at least one image may involve acquiring a plurality of video frames representing real time movements of the load transfer container.

Acquiring the plurality of video frames may involve activating a video camera to produce the plurality of video frames, the video camera being operably configured to have a field of view with at least a portion of the load transfer container and at least a portion of the load carrying container may be observable.

Wirelessly transmitting the image signal may involve transmitting one of a video signal including a plurality of video frames representing real time movements of the load transfer container, a plurality of image signals, each of the plurality of image signals representing a still image of one of a plurality of discrete states occurring during the loading operation, and a screen image signal representing a copy of a screen image produced and displayed on a display associated with the load transfer container.

Wirelessly transmitting the image signal may involve transmitting an image signal having transmission characteristics that limit reception of the image signal within a predetermined radius from the load transfer container.

Wirelessly transmitting the image signal may involve transmitting an image signal having first transmission characteristics to prevent interference with a second image signal produced by a second load transfer container, the second image signal having second transmission characteristics.

Transmitting the image signal having first transmission characteristics may involve transmitting a first analog image signal having frequencies within a first frequency band, and the second image signal may include a second analog image signal having frequencies within a second frequency band.

The method may involve transmitting a control signal encoded with information representing the first transmission characteristics of the image signal.

The method may involve receiving a first position signal, the first position signal indicating a location of the load carrying container, determining a location of the load transfer container, and transmitting the control signal may involve transmitting a control signal encoded with configuration information for configuring a receiver associated with the load carrying container to receive the image signal when a distance between the load carrying container and the load transfer container meets a criterion.

The method may involve producing a second position signal, the second position signal indicating a location of the load transfer container, and transmitting the control signal may involve transmitting a control signal encoded with information representing the location of the load transfer container to permit a receiver associated with the load carrying container to be configured to receive the image signal when a distance between the load carrying container and the load transfer container meets a criterion.

Producing the second position signal may involve producing the second position signal in response to receiving global positioning system (GPS) satellite signals.

Transmitting the control signal may involve transmitting a control signal including channel information identifying a channel for transmitting the image signal.

In accordance with another aspect of the invention there is provided a method for monitoring loading of a payload into a load carrying container. The method involves wirelessly receiving an image signal representing at least one image of a load transfer container acquired during operation of the load transfer container by a first operator to load the payload into the load carrying container. The method also involves producing A display signal for causing the at least one image to be displayed for viewing by a second operator to facilitate monitoring of the loading of the payload.

The method may involve causing a loading condition observed by the second operator to be annunciated for alerting the first operator to the loading condition.

Causing the loading condition to be annunciated may involve causing the loading condition to be wirelessly annunciated.

Causing the loading condition to be wirelessly annunciated may involve wirelessly transmitting an annunciation signal produced in response to a vocal alert uttered by the second operator for reception by a first receiver associated with the load transfer container.

Causing the loading condition to be wirelessly annunciated may involve transmitting the annunciation signal to a dispatch center for relaying to the first receiver.

Causing the loading condition to be wirelessly annunciated may involve establishing a two-way radio link between the first and second operators to permit voice communication between the first and second operators for alerting the first operator to the loading condition.

Causing the loading condition to be annunciated may involve causing annunciation of at least one of a structural condition of the load transfer container, a hazard associated with the loading of the payload into the load carrying container, an indication that a payload portion in the load transfer container exceeds a safe loading size, and an indication that a payload portion in the load transfer container includes undesired materials or detritus, an indication of a non-uniform loading condition occurring in the load carrying container, and an indication that the loading operation should be discontinued.

The second operator may be located in a compartment of the load carrying container, and producing the display signal may involve producing a display signal for causing the at least one image to be displayed on a display located in the compartment.

Wirelessly receiving the image signal may involve receiving the image signal at a wireless interface of a portable display device.

Wirelessly receiving the image signal may involve receiving one of a video signal including a plurality of video frames representing real time movements of the load transfer container, a plurality of image signals, each of the plurality of image signals representing a still image of one of a plurality of a discrete states occurring during the loading operation, and a screen image signal representing a copy of a screen image produced and displayed on a display associated with the load transfer container.

Wirelessly receiving the image signal may involve receiving a plurality of image signals having differing transmission characteristics and causing an image signal receiver to be configured to selectively receive one of the plurality of image signals having transmission characteristics that provide for best reception.

The method may involve receiving a control signal encoded with information representing first transmission characteristics of the image signal and wirelessly receiving the image signal may involve causing a second receiver to be configured for receiving the image signal having the first transmission characteristics.

Receiving the control signal may involve receiving a plurality of control signals, each control signal including an identification of one of a plurality of load transfer containers, and may further involve causing the second operator to be prompted to select one of the plurality of load transfer containers for monitoring.

Receiving the control signal may involve receiving a control signal encoded with information representing a location of the load transfer container and may further involve determining a location of the load carrying container, and causing a second receiver associated with the load carrying container to be configured to receive the image signal when a distance between the load carrying container and the load transfer container meets a criterion.

Determining the location of the load transfer container may involve receiving a global positioning system (GPS) signal.

Causing the second receiver associated with the load carrying container to be configured to receive the image signal when the distance between the load carrying container and the load transfer container meets the criterion may involve causing the second receiver to be configured to receive the image signal when the load-transfer container is closer to the load carrying container than other load transfer containers.

Receiving the image signal may involve causing a receiver to periodically attempt to establish a communications link with transmitters in range of the first receiver, each transmitter being associated with one of a plurality of load transfer containers, and selecting one of the transmitters for receiving the image signal when a communications link between the one of the transmitters meets a quality-of-service criterion.

The method may involve monitoring the quality-of-service while receiving the image signal and discontinuing the receiving in response to the quality-of-service falling below the quality of service criteria.

The method may involve selecting another one of the transmitters for receiving the image signal when a communications link between the one of the transmitters meets the quality-of-service criterion.

In accordance with another aspect of the invention there is provided an image signal generator apparatus for producing an image signal to facilitate monitoring of loading of a payload into a load carrying container. The apparatus includes a camera operably configured to acquiring at least one image of a load transfer container during operation of the load transfer container by a first operator to load the payload into the load carrying container. The apparatus also includes an image signal transmitter operably configured to wirelessly transmit an image signal representing the at least one image to permit reception and display of the at least one image for viewing by a second operator to facilitate monitoring of the loading of the payload by the second operator.

The apparatus may include a receiver operably configured to receive an annunciation alerting the first operator to a loading condition observed by the second operator.

The receiver may be operably configured to receive a wirelessly transmitted annunciation of the loading condition.

The receiver may be operably configured to receive an annunciation signal at a receiver associated with the load transfer container, the annunciation signal being produced in response to a vocal alert uttered by the second operator.

The receiver may be operably configured to receive a relayed annunciation signal from a dispatch center.

The receiver may be operably configured to receive an annunciation of at least one of a structural condition of the load transfer container, a hazard associated with the loading of the payload into the load carrying container, an indication that a payload portion in the load transfer container exceeds a safe loading size, and an indication that a payload portion in the load transfer container may include undesired materials or detritus, an indication of a non-uniform loading condition occurring in the load carrying container, and an indication that the loading operation should be discontinued.

The camera may be operably configured to acquire a plurality of video frames representing real time movements of the load transfer container.

The camera may be operably configured to have a field of view with at least a portion of the load transfer container and at least a portion of the load carrying container is observable.

The image signal transmitter may be operably configured to transmit one of a video signal including a plurality of video frames representing real time movements of the load transfer container, a plurality of image signals, each of the plurality of image signals representing a still image of one of a plurality of a discrete states occurring during the loading operation, and a screen image signal representing a copy of a screen image produced and displayed on a display associated with the load transfer container.

The image signal transmitter may be operably configured to transmit an image signal having transmission characteristics that limit reception of the image signal within a predetermined radius from the load transfer container.

The image signal transmitter may be operably configured to transmit an image signal having first transmission characteristics to prevent interference with a second image signal produced by a second load transfer container, the second image signal having second transmission characteristics.

The image signal transmitter may be operably configured to transmit a first analog image signal having frequencies within a first frequency band, and the second image signal may include a second analog image signal having frequencies within a second frequency band.

The apparatus may include a control signal transmitter operably configured to transmit a control signal encoded with information representing the first transmission characteristics of the image signal.

The image signal transmitter may be configurable to act as the control signal transmitter.

The apparatus may include a first controller operably configured to receive a first position signal, the first position signal indicating a location of the load carrying container, determine a location of the load transfer container, and the control signal transmitter may be operably configured to transmit a control signal encoded with configuration information for configuring a receiver associated with the load carrying container to receive the image signal when a distance between the load carrying container and the load transfer container meets a criterion.

The apparatus may include a first controller operably configured to produce a second position signal, the second position signal indicating a location of the load transfer container, and transmitting the control signal may include transmitting a control signal encoded with information representing the location of the load transfer container to permit a receiver associated with the load carrying container to be configured to receive the image signal when a distance between the load carrying container and the load transfer container meets a criterion.

The apparatus may include a global positioning system (GPS) receiver operably configured to produce the second position signal in response to receiving GPS satellite signals.

The control signal transmitter may be operably configured to transmit a control signal including channel information identifying a channel for transmitting the image signal.

In accordance with another aspect of the invention there is provided an image signal transmitter apparatus for use with an image signal processing system, the image signal processing system including a camera operably configured to acquire at least one image of a load transfer container during operation of the load transfer container by a first operator to load the payload into the load carrying container. The image signal processing system has an image signal output for producing an image signal. The image signal transmitter apparatus includes an input for receiving the image signal from the image signal output, the image signal transmitter being operably configured to wirelessly transmit an image signal representing the at least one image to permit reception and display of the at least one image for viewing by a second operator to facilitate monitoring of the loading of the payload by the second operator.

In accordance with another aspect of the invention there is provided a display signal generator apparatus for monitoring loading of a payload into a load carrying container. The apparatus includes an image signal receiver operably configured to wirelessly receive an image signal representing at least one image of a load transfer container acquired during operation of the load transfer container by a first operator to load the payload into the load carrying container. The apparatus also includes the image signal receiver being operably configured to produce a display signal for causing the at least one image to be displayed for viewing by a second operator to facilitate monitoring of the loading of the payload.

The apparatus may include an annunciation signal transmitter operably configured to cause a loading condition observed by the second operator to be wirelessly transmitted for alerting the first operator to the loading condition.

The annunciation signal transmitter may be operably configured to wirelessly transmit an annunciation signal produced in response to a vocal alert uttered by the second operator.

The annunciation signal transmitter may be operably configured to transmit an annunciation of at least one of a structural condition of the load transfer container, a hazard associated with the loading of the payload into the load carrying container, an indication that a payload portion in the load transfer container exceeds a safe loading size, and an indication of a non-uniform loading condition occurring in the load carrying container.

The second operator may be located in a compartment of the load carrying container, and the load carrying container may further include a display mounted in the compartment, the display being operably configured to cause the at least one image to be displayed on the display in response to receiving the display signal.

The image signal receiver may include a wireless interface of a portable display device.

The image signal receiver may be operably configured to receive one of a video signal including a plurality of video frames representing real time movements of the load transfer container, a plurality of image signals, each of the plurality of image signals representing a still image of one of a plurality of a discrete states occurring during the loading operation, and a screen image signal representing a copy of a screen image produced and displayed on a display associated with the load transfer container.

The image signal receiver may be operably configured to receive a plurality of image signals and to select one of the plurality of image signals having transmission characteristics that provide for best reception.

The apparatus may include a second controller in communication with a control signal receiver for receiving a control signal encoded with information representing first transmission characteristics of the image signal, the second controller being operably configured to cause the image signal receiver to be configured for receiving the image signal having the first transmission characteristics.

The image signal receiver may be configurable to act as the control signal receiver.

The control signal receiver may be operably configured to receive a plurality of control signals, each control signal including an identification of one of a plurality of load transfer containers, and the second controller may be operably configured to cause the second operator to be prompted to select one of the plurality of load transfer containers for monitoring.

The second controller may be operably configured to cause the control signal receiver to receive a control signal encoded with information representing a location of the load transfer container, determine a location of the load carrying container, and cause the image signal receiver to be configured to receive the image signal when a distance between the load carrying container and the load transfer container meets a criterion.

The apparatus may include a global positioning system (GPS) receiver operably configured to produce a position signal representing the location of the load carrying container in response to receiving GPS satellite signals.

The apparatus may include a second controller in communication with the image signal receiver, the second controller being operably configured to cause the image signal receiver to periodically attempt to establish a communications link with image signal transmitters in range of the first receiver, each image signal transmitter being associated with one of a plurality of load transfer containers, and to select one of the image signal transmitters for receiving the image signal when a communications link between the one of the transmitters meets a quality-of-service criterion.

The second controller may be operably configured to monitor the quality-of-service while receiving the image signal and to discontinue the receiving in response to the quality-of-service falling below the quality-of-service criterion.

The second controller may be operably configured to select another one of the transmitters for receiving the image signal when a communications link between the one of the transmitters meets the quality-of-service criterion.

In accordance with another aspect of the invention there is provided a method for monitoring loading of a payload into a load carrying container. The method involves acquiring at least one image of a load transfer container during operation of the load transfer container by a first operator to load the payload into the load carrying container, and wirelessly transmitting an image signal representing the at least one image. The method also involves receiving the image signal and producing a display signal for causing the at least one image to be displayed for viewing by a second operator to facilitate monitoring of the loading of the payload.

In accordance with another aspect of the invention there is provided a system for monitoring loading of a payload into a load carrying container. The system includes an image signal generator. The image signal generator includes a camera operably configured to acquire at least one image of a load transfer container during operation of the load transfer container by a first operator to load the payload into the load carrying container. The image signal generator also includes an image signal transmitter operably configured to wirelessly transmit an image signal representing the at least one image. The system also includes a display signal generator operably configured to receive the image signal and to produce a display signal for causing the at least one image to be displayed for viewing by a second operator to facilitate monitoring of the loading of the payload.

In accordance with another aspect of the invention there is provided a method for monitoring a location of a load carrying container with respect to an obstacle. The method involves acquiring at least one image of a terrain surrounding the obstacle, and wirelessly transmitting an image signal representing the at least one image to permit reception and display of the at least one image for viewing by an operator to facilitate monitoring of a location of the load carrying container relative to the obstacle.

In accordance with another aspect of the invention there is provided an image signal generator apparatus for producing an image signal to facilitate monitoring a location of a load carrying container with respect to an obstacle. The apparatus includes a camera located proximate the obstacle and operably configured to acquire at least one image of a terrain surrounding the obstacle, and an image signal transmitter operably configured to wirelessly transmit an image signal representing the at least one image to permit reception and display of the at least one image for viewing by an operator to facilitate monitoring of a location of the load carrying container relative to the obstacle.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

In surface mining environments in particular, mining shovel operators are usually occupied on an ongoing basis since there may be several haul trucks waiting to be loaded. While the shovel operator is responsible for safe excavation and loading of ore payload onto the haul trucks, the shovel operator has to simultaneously manipulate the controls for performing the loading operation while simultaneously monitoring several displays indicating operating conditions of the shovel and maintaining two-way radio contact with a dispatch center. The operator of the load-transfer container is thus usually very busy during loading operations. The inventors have realized that during loading operations an operator of the haul truck has time for monitoring the loading operation, but may only have a constrained view of the load-transfer container (i.e. the bucket of the mining shovel).

Accordingly, while the haul truck operator may be able to assist in monitoring at least some loading conditions, actual observation of the payload transfer by the haul truck operator may be inconvenient or even unsafe, since the driver's vantage point may provide only a limited view of the shovel operation and in most mining environments the haul truck operators are prohibited by safety regulations from leaving the cab of their haul truck. Additionally, even if the driver were permitted to leave the cabin of the truck, the view of the load transfer container from the ground may in any case be rather limited.

Other operators at the minesite, such as a shift supervisor for example, may also be charged with some responsibility for monitoring loading operations of one or more mining shovels. Such supervisory personnel may be temporarily on-foot, but would more likely be driving a pick-up truck or other vehicle. While the supervisory personnel may be able to approach the mining shovel they would be constrained from obtaining a close-up view due to the height of the shovel and the haul trucks involved the in loading operations, and due to the need to maintain a safe clearance distance from the operating mining shovel.

Similar considerations generally apply to other environments, such as quarries, construction sites, and demolition sites, for example.

System Overview

Figure 1:
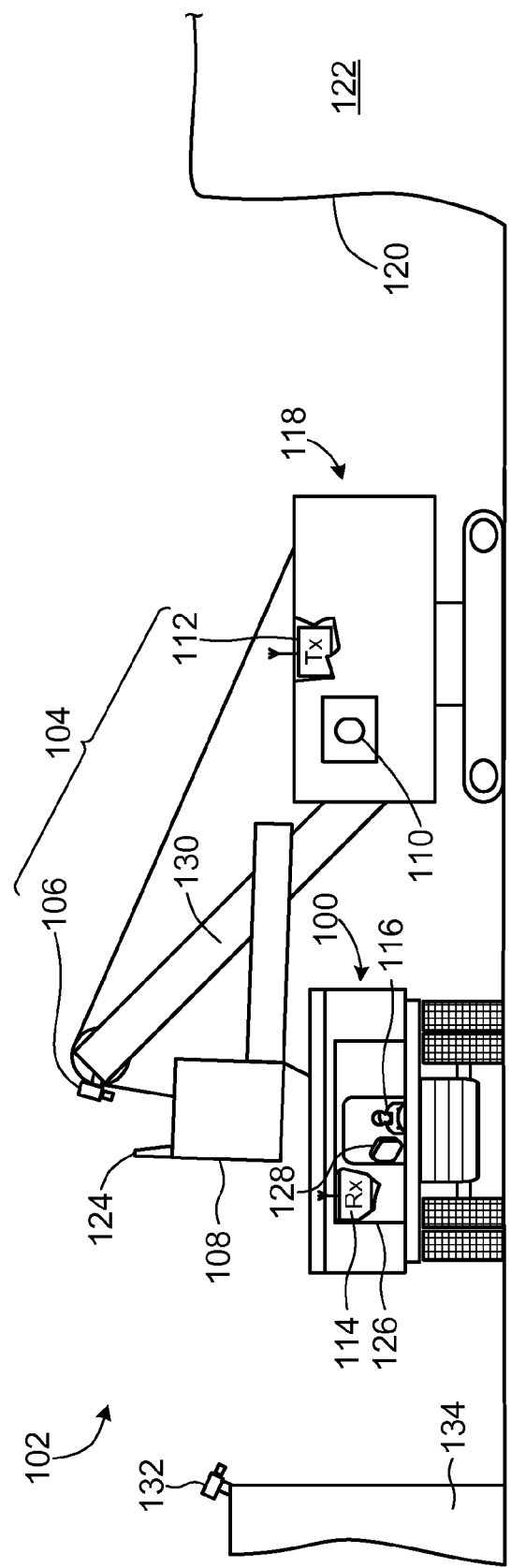
FIG. 1 is a side view of load transfer container being operated to load a payload into a load carrying container in accordance with a first embodiment of the invention.

Referring to FIG. 1, a system for monitoring loading of a payload into a load carrying container 100 according to a first embodiment of the invention is shown generally at 102. The system 102 includes an image signal generator 104. The image signal generator 104 includes a camera 106 and an image signal transmitter 112. The camera 106 is operably configured to acquire at least one image of a load transfer container 108 during operation of the load transfer container by a first operator 110 to load the payload into the load carrying container 100. The image signal transmitter 112 is operably configured to wirelessly transmit an image signal representing the at least one image.

The system 102 also includes a display signal generator 114 operably configured to receive the image signal and to produce a display signal for causing the at least one image to be displayed for viewing by a second operator 116 to facilitate monitoring of the loading of the payload.

In the embodiment shown in FIG. 1, the load transfer container 108 is a loading bucket of a mining shovel 118, which is used to excavate the payload from a mine face 120 in an open pit mine. In other embodiments, the load transfer container 108 may be a dipper of a cable shovel, or a bucket of a hydraulic face shovel, dragline, or backhoe excavator, or any other load transfer device coupled to various types of loading machinery for loading the payload. In some embodiments, the haul truck 100 may further include a crushing unit on the back of the haul truck (not shown) for crushing the ore payload being loaded onto the haul truck.

In this embodiment the payload is an ore deposit 122 having a mineral content, which is to be extracted in subsequent processing operations. Generally, the mining shovel 118 operates to excavate the mine face 120 of the ore deposit 122, and transfers the payload to the load carrying container 100.

In this embodiment, the load carrying container 100 is an open box of a large haul truck under control of the second operator 116. The second operator 116 drives the load carrying container 100 to a transfer location proximate the mining shovel 118. In some embodiments, the haul truck 100 may further include a crushing unit on the back of the haul truck (not shown) for at least partially crushing the payload being loaded onto the haul truck.

In the embodiment shown in FIG. 1, the second operator is located in a driving cabin 126 of the load carrying container 100. The driving cabin 126 is equipped with a display 128 positioned for viewing by the second operator 116. The display 128 is coupled to the display signal generator 114 for receiving the display signal. Advantageously, while the first operator 110 is occupied with the loading of the payload, the second operator 116 is waiting for loading to complete, and therefore has sufficient idle time to permit monitoring of the display 128.

Such monitoring may involve observing images to determine a structural condition of the load transfer container, such as a condition of loading teeth or other ground engagement features of the load transfer container 124. The second operator 116 may also alert the first operator 110 to potentially problematic structural conditions observed. For example, a bucket component of the mining shovel 118 such as tooth, adapter, lip shroud, shank, or wear plate (not shown) may become detached from the bucket and be incorporated in the payload. In embodiments where the haul truck 100 includes a crushing unit, if the detached bucket component is transferred to the crushing unit obstruction and/or structural damage may occur, causing significant downtime as well as safety hazards associated with removing of the obstructions from the crushing unit. In general, such structural conditions of the load transfer container 108 may be observed by the second operator 116 during loading or may be observed prior to commencement of the loading operation.

The second operator 116 may also alert the first operator 110 to a hazard associated with the loading of the payload, such as the presence of large boulders, metals, or other detritus in the load transfer container 108 or a non-uniform loading condition occurring in the load carrying container 100.

The second operator 116 is also made aware of the progress of the loading operation through the displayed images, and would be able to anticipate a large load being transferred from the load transfer container 108 to the load carrying container 100, thereby avoiding surprise and possible injury due to the payload impacting the container and causing a jolt. Such injuries may be further compounded if the transferred load is heavy, contains large boulders, or is dropped unevenly into the load carrying container 100. Each transfer of payload may weigh in excess of 20 metric tons but in the case of the largest mining shovels could weigh in excess of 100 metric tons, thus causing a substantial impact when transferred to the load carrying container 100.

The camera 106 is distally mounted on a boom 130 of the mining shovel 118, to provide a view of the load transfer container 108 and at least a portion of the load carrying container 100. In this embodiment, the camera 106 produces a video image signal including a plurality of video frames representing real time movements of the load transfer container 108. Alternatively, the camera 106 may produce one or more still images of discrete states occurring during the loading operation.

In other embodiments, a plurality of cameras may be may be mounted on the mining shovel 118 to provide further views of the terrain surrounding the mining shovel. In this embodiment, the system 102 further includes a camera 132 mounted in a fixed location on a structure 134. The structure 134 may be a permanent or semi-permanent equipment installation, building, or other structure, which may be close to the path of the load carrying container 100. Large mining trucks typically have a severely restricted view of the terrain located close to the truck and may not have an adequate view of obstacles in the path of the truck. The camera 132 may be used to provide a view of the terrain surrounding the structure, which would also include a view of the approaching truck, thus allowing the second operator 116 of the truck to view the terrain and the location of the truck relative to the structure 134.

Ruggedized camera systems having wide angle field of view for this purpose are available from Motion Metrics International Corporation of Vancouver, British Columbia, Canada, under the brand name "ViewMetrics". Alternatively, or additionally, the camera 106 may be configured to provide views of structural components of the load transfer container 108. For example, the "ToothMetrics™" system, also available from Motion Metrics International Corporation, provides views of the loading teeth 124 of the load transfer container 108, and further performs image processing on the acquired images to detect wear or damage to the loading teeth.

Image Signal Generator

Figure 2:
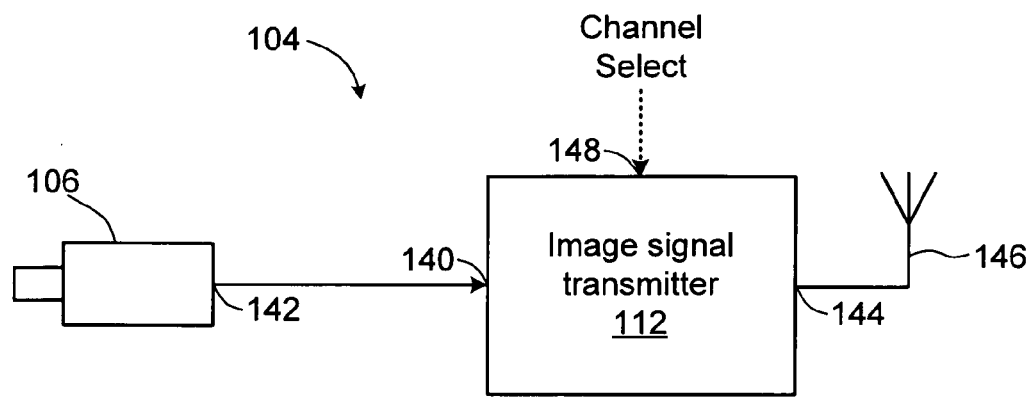
FIG. 2 is a block diagram of an image signal generator in accordance with one embodiment of the invention.

A block diagram of the image signal generator is shown schematically at 104 in FIG. 2. Referring to FIG. 2, the image signal generator 104 includes an image signal transmitter 112. The image signal transmitter 112 includes an input 140 for receiving image data or image signals from an output 142 of the camera 106. The image signal transmitter 112 also includes an output 144 for coupling an antenna 146.

The image signal transmitter 112 also optionally includes an input 148 for receiving a channel selection signal for selecting a frequency band for transmitting the image signal. The channel selection signal may be produced by a channel selection switch that facilitates operator selection of a transmission channel for transmitting the image signal, for example.

In one embodiment the camera 106 comprises an analog video camera that produces an analog image signal in NTSC, PAL or SECAM signal format and the image signal transmitter 112 and the antenna 146 may be implemented using a commercially available short or medium distance analog video transmitter. An example of a suitable image signal transmitter is the VideoWave line of wireless analog transmitters available from Radio Data Technology Ltd of Essex, United Kingdom.

In other embodiments, the camera 106 may be configured to produce a digital video signal at the output 142, which is received at the input 140 and transmitted using digital wireless transmission techniques. For example, the camera 106 may produce the digital video signal complying with one of a plurality of different formats such as Gigabit Ethernet, IEEE 1394, Universal Serial Bus (USB), or CameraLink. In this case the image signal transmitter 112 and antenna 146 may be implemented using various digital wireless techniques such as a wireless Ethernet mesh network.

In other embodiments, the image signal generator 104 may be implemented using hybrid analog and digital signals. For example, an analog image signal may be received at the input 140 and the image signal transmitter 112 may include analog to digital converters for converting the analog image signal into digital data representing the analog signal for wireless digital transmission. In other embodiments, the image signal produced at the output 142 may also be wirelessly transmitted from the camera 106 to the input 140 of the image signal transmitter 112, thereby avoiding the need to run cables between the camera and the image signal transmitter on the mining shovel 118 (shown in FIG. 1).

Display Signal Generator

Figure 3:
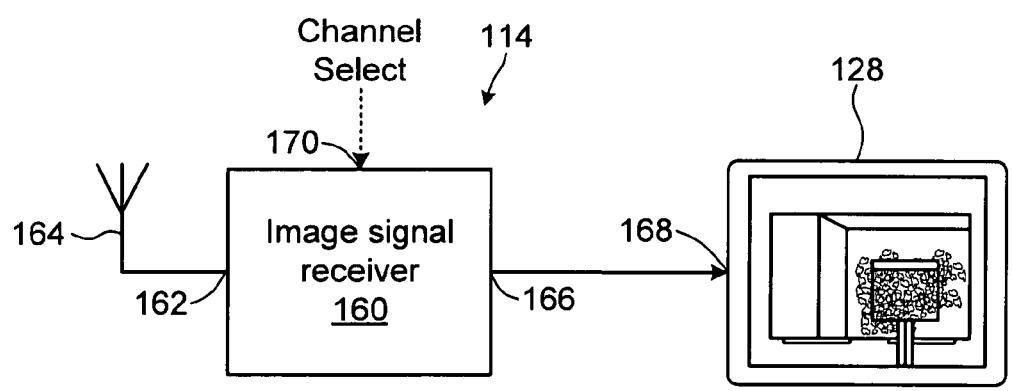
FIG. 3 is a block diagram of a display signal generator in accordance with one embodiment of the invention.

The display signal generator is shown schematically at 114 in FIG. 3. Referring to FIG. 3, the display signal generator 114 includes an image signal receiver 160 having an input 162 coupled to an antenna 164 for receiving the image signal transmitted from the image signal generator 104 shown in FIG. 2. The image signal receiver 160 is configured to receive the image signal in either digital or analog format, depending on the format of the image signal transmitted by the image signal generator 104. In the embodiment shown, the image signal receiver 160 also include an input 170 for receiving a channel selection signal for selecting a frequency band for receiving the image signal.

The image signal receiver 160 also includes an output 166 for producing the display signal. In this embodiment, the display signal produced at the output 166 is coupled to an input 168 of the display 128. The display signal may be an analog or digital signal, depending on the requirements for driving the display 128. Examples of various analog and digital display signal formats that are used to drive conventional computer displays include VGA, DVI-I, and HDMI.

Operation

Figure 4:
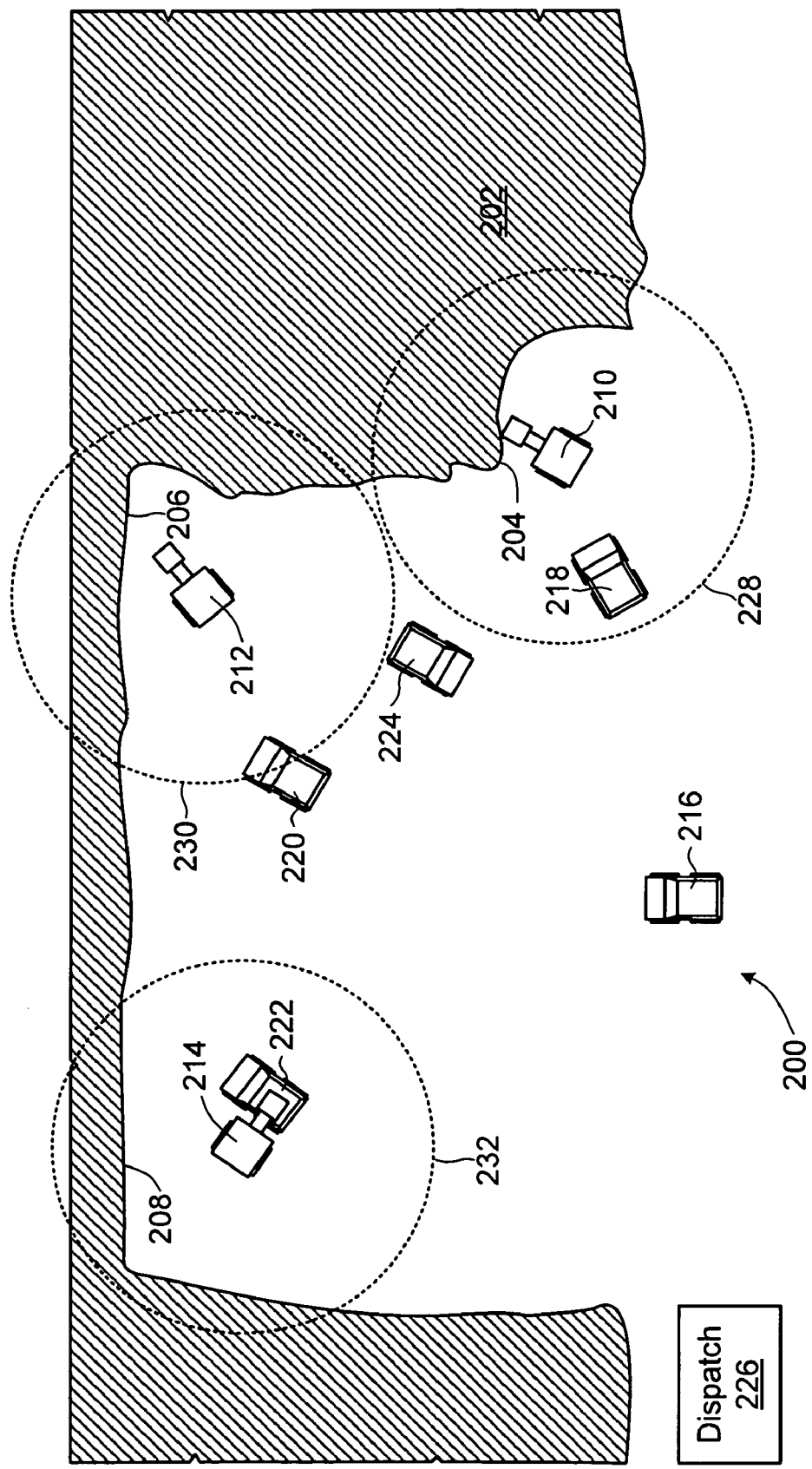
FIG. 4 is a plan view of an exemplary mine site.

Operation of the system 102 shown in FIGS. 1-3 to provide analog image signal transmission at a mine site is described with reference to FIG. 4. Referring to FIG. 4, a top view of an exemplary mine site is shown generally at 200. The mine site 200 includes un-excavated ore deposits or overburden 202 including a plurality of mine faces 204, 206, and 208, which are being respectively excavated by first, second, and third mining shovels 210, 212, and 214. Each mining shovel 210-214 includes a load transfer container such as the load transfer container 108 shown in FIG. 1. Each mining shovel 210-214 also includes an image signal generator such as that shown at 104 in FIG. 2, each configured for communication on one of a plurality of pre-determined communication channels by the channel select signal at the input 148. In this embodiment, each of the mining shovels 210-214 is configured to communicate on a different frequency channel to prevent interference between transmissions originated by the respective shovels. In other embodiments the communication channels may have a common frequency, with provision of separate channels being provided by time division multiplexing, for example.

The mine site 200 is serviced by a plurality of load-conveying haul trucks 216, 218, 220, 222, and 224, which transport the payload to a secondary processing facility (not shown). Each haul truck 216-224 includes a display signal generator such as the display signal generator shown in FIG. 3. As shown in FIG. 4, the haul truck 216 has just arrived at the mine site 200, the haul truck 224 has just completed loading by the mining shovel 212 and is leaving the mine site, and the haul trucks 218 and 220 are approaching the mining shovels 210 and 212 respectively. The haul truck 222 is being loaded by the mining shovel 214.

A mine site dispatch center 226 is located on the mine site 200 and is in two-way radio contact with the mining shovels 210-214 and the haul trucks 216-224. Such radio contact may be established using conventional VHF or UHF two-way radios. As the haul truck 216 arrives at the mine site, the truck operator radios in to the dispatch center 226 and is assigned to service a particular mining shovel. For example, the haul truck 216 may be assigned to the mining shovel 214, which has partially completed loading of the haul truck 222. When assigning the haul truck 216 to the shovel 214, the dispatch center 226 also informs the haul truck operator of the communications channel assigned to the shovel 214 for communication.

The operator of the haul truck 216 then manually configures the image signal receiver 160 (shown in FIG. 3) for receiving on the assigned communications channel and as the haul truck moves into range of the image signal transmitter 112 of the mining shovel 214, the operator of the haul truck is able to view the loading operations of the mining shovel and provide feedback of any loading condition that the shovel operator should be made aware of. Advantageously, since the respective transmitters of each mining shovel 210-214 are each configured to operate on different communication channels, there is no interference between the different image signals transmitted by the mining shovels.

Alternatively, in large mine sites where greater numbers of mining shovels are operated, the same communications channel may be assigned to more than one mining shovel, provided that the shovels are spaced apart sufficiently to minimize interference between their respectively transmitted image signals. In one embodiment, the image signal transmitter 112 is configured to transmit the image signal with sufficient Radio Frequency (RF) power level to facilitate reception of the image signal by haul truck image signal receivers within a reception area within a radius of at most about 50 meters from the mining shovel. Reception areas for each of the mining shovels 210, 212, and 214 are respectively indicated by broken lines 228, 230, and 232 in FIG. 4. The haul truck 224, which has been loaded by the mining shovel 212, has moved just outside the broken line 230 representing the reception area for the mining shovel 212, while the haul truck 220 is just within the reception area. Accordingly, the haul truck 224 will experience weak or no reception of the image signal from the mining shovel 212, while the haul truck 220 will experience improving reception as the haul truck approaches the mining shovel. When the haul truck 224 receives the image signal from the mining shovel 212, the operator of the haul truck may monitor the displayed image signal. For example, as the haul truck 224 enters the displayed image the operator may use the displayed image to optimize an approach path toward the mining shovel 212.

In other embodiments, the dispatch center 226 may be computerized to provide automated assignments of haul trucks to shovels and automated channel selection for receiving image signals, thereby reducing the need for dispatch center operators.

Advantageously, such a manually configured system using analog signals may be cost-effectively implemented to provide for monitoring of loading operations. Similar manually configured digital systems, or hybrid analog/digital systems may also be implemented.

Alternative Embodiments

Figure 5:
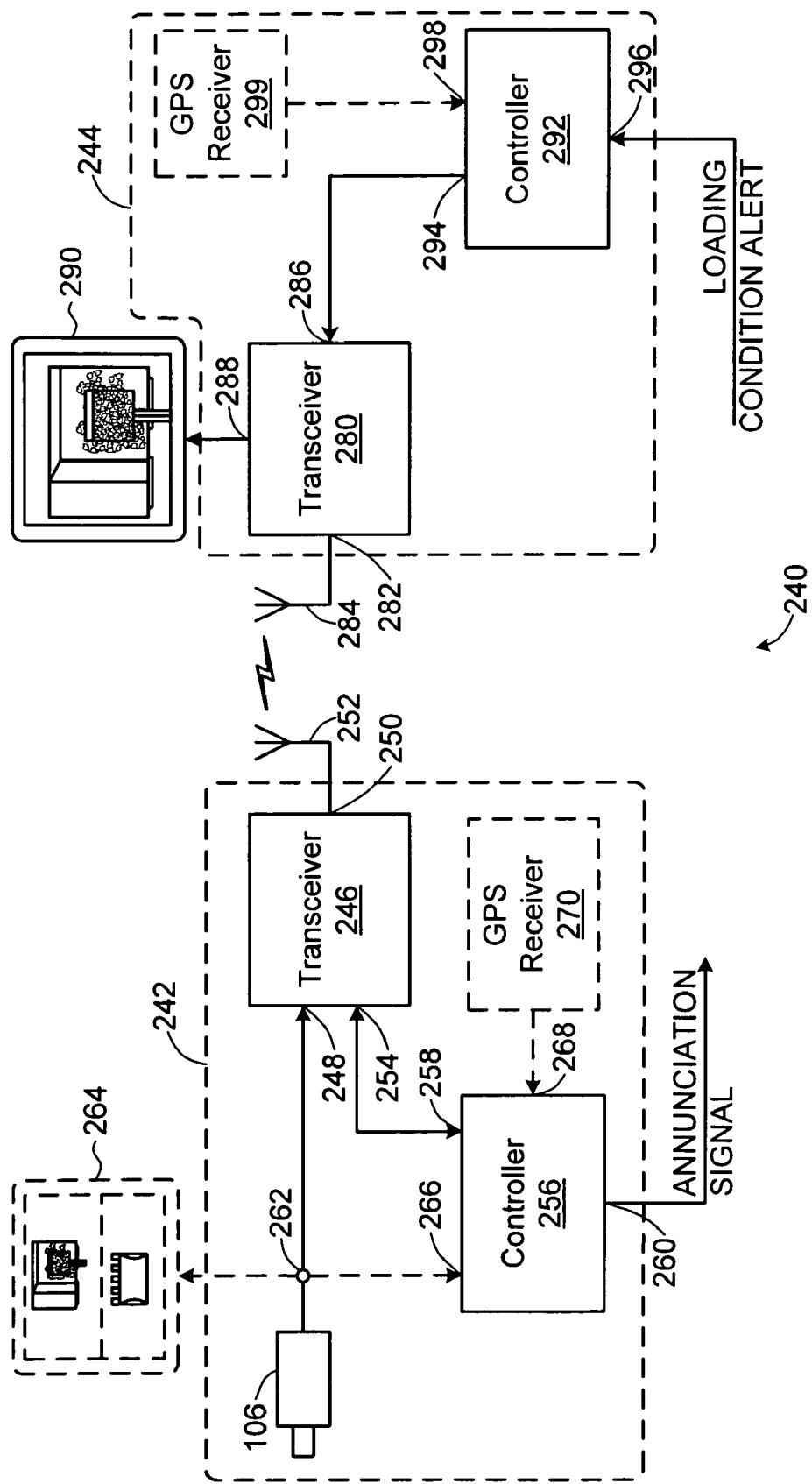
FIG. 5 is a block diagram of an alternative embodiment of a system for monitoring loading of a payload.

Referring to FIG. 5, an alternative embodiment of a system for monitoring loading of a payload is shown generally at 240. The system 240 includes an image signal generator 242 and a display signal generator 244.

The image signal generator 242 may be located on a load transfer container, such as the mining shovel 118 shown in FIG. 1. The display signal generator 244 may be located in a load-carrying haul truck, but may also be located in another vehicle such as a pick-up truck, excavator, or other vehicle that is deployed at the mine site. Alternatively the display signal generator may be implemented as a portable device carried by an operator working at the mine site.

The image signal generator 242 includes the camera 106 for acquiring images of the loading operation as described above. The image signal generator 242 also includes a first transceiver 246, which has an input 248 coupled to the camera 106 for receiving digital or analog image signals from the camera. The first transceiver 246 also has an antenna port 250 for coupling an antenna 252 for transmission and reception of wireless signals. The first transceiver 246 also has an input/output 254 for receiving a configuration signal for configuring and controlling operation of the first transceiver to transmit the image signal and to transmit or receive control signals to or from a display signal generator (such as the display signal generator 244). The input/output 254 also acts as an output when the first transceiver 246 receives transmitted annunciation signals, as described later herein. The control signals are generally encoded with information for controlling transmission of the image signal, as will be further described below.

The image signal generator 242 also includes a first controller 256, which is in communication with the first transceiver 246 and includes an input/output port 258 for producing the configuration signal for configuring the first transceiver for transmission of the image signal and transmission/reception of the control signal and for receiving annunciation signals. The first controller 256 also includes an output 260 for producing an annunciation signal for alerting the operator to a loading condition.

The annunciation signals may indicate one of a plurality of conditions including a structural condition of said load transfer container, a hazard associated with the loading of the payload into the load carrying container, an indication that a payload portion in said load transfer container exceeds a safe loading size, an indication that a payload portion in said load transfer container includes undesired materials or detritus, and/or and indication of a non-uniform loading condition occurring in the load carrying container. The annunciation signals may also indicate that the loading operation should be discontinued to permit rerouting of the haul truck 100 to a special area for inspection and/or disposal of load, should this be necessary.

The image signal generator 242 may optionally include a signal splitter 262, which splits the signal produced by the camera 106 to produce a signal for driving a display 264. The display 264 is generally located for viewing by the first operator (or other operator at the minesite) and permits the first operator to be able to confirm correct operation of the camera 106 and/or to confirm a loading condition alert annunciated by the second operator.

The first controller 256 may also include an input 266 for receiving the image signal and an input 268 for receiving a position signal. In this embodiment the image signal generator 242 includes a Global Positioning System (GPS) receiver 270, which produces the position signal. In other embodiments the position signal may be received from a separate GPS receiver provided for monitoring the location of the mining shovel.

The display signal generator 244 includes a second transceiver 280 having an antenna port 282 for coupling an antenna 284. The second transceiver 280 also includes an input 286 for receiving a configuration signal for configuring the second transceiver to receive the wirelessly transmitted image signal from the first transceiver 246, or to transmit or receive control signals. The second transceiver 280 also includes an output 288 for producing a display signal. The display signal is coupled to a display 290 for displaying the image of the load transfer container for viewing by the second operator.

The display signal generator 244 also includes a second controller 292, which includes an output 294 for producing the configuration signal for configuring the second transceiver 280 for reception of image signals from one or more image signal generators (such as the image signal generator 242), and for controlling transmission and reception of control signals by the second transceiver. The second controller 292 also includes an input 296 for receiving loading condition alert signal, which may be produced by one or more switch actuators (not shown) provided for operation by the second operator.

The second controller 292 also optionally includes an input 298 for receiving a geographic position signal, which may be provided by a GPS receiver 299 or other GPS receiver located in proximity to the display signal generator 244.

As described above the system 240 may be implemented using digital or analog signals and components or may be implemented as a hybrid analog/digital system.

Figure 6:
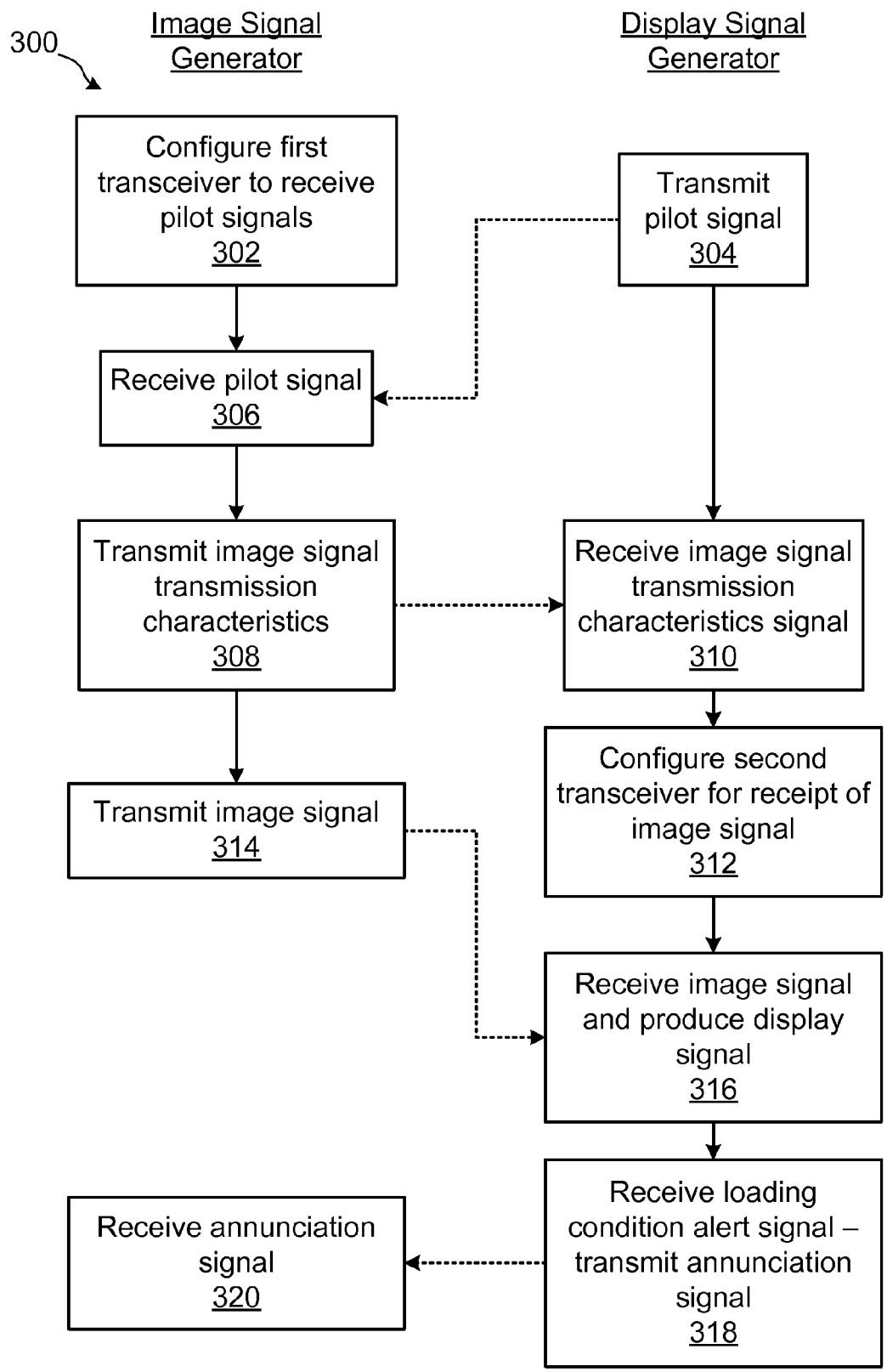
FIG. 6 is a process flowchart illustrating a first operational embodiment of the system shown in FIG. 5.

Various operational embodiments of the system 240 may be implemented. Referring to FIG. 6, a process in accordance with a first operational embodiment is shown generally at 300. In this embodiment, the image signal generator 242 is located on a mining shovel and communications between a display signal generator 244 located on a haul truck are established as the haul truck approaches the mining shovel.

Establishment of a communication link between the display signal generator 244 and the image signal generator 242 commences at block 302 when the first controller 256 of the image signal generator 242 causes the first transceiver 246 to be configured to receive a pilot signal from a display signal generator that is in communication range of the mining shovel.

As shown at block 304, when a haul truck equipped with the display signal generator 244 approaches the mining shovel, the second controller 256 causes the second transceiver 280 to transmit the pilot signal. In general the pilot signal announces the presence of the haul truck and may be received by more than one transceiver (such as the first transceiver 246) in range. As shown at block 306, the pilot signal is received by the first transceiver 246, and in response, the first controller 256 causes the first transceiver to transmit a signal encoded with information identifying image signal transmission characteristics, as shown at block 308. Optionally, the first controller 256 may also cause an identifier associated with the mining shovel to be transmitted.

As shown at block 310, the second controller 292 configures the second transceiver 280 to receive the image signal transmission characteristics, and at block 312, configures the second transceiver for receiving the image signal.

As shown at block 314, the first controller 256 then causes the first transceiver 246 to begin transmission of the image signal. As shown at block 316, the second transceiver 280 receives the image signal at the antenna 284 and demodulates the image signal to produce the display signal at the output 288 of the second transceiver 280.

The second operator is thus able to view the image of the load transfer container on the display 290, thereby permitting monitoring of the loading operation.

Should the second operator observe a loading condition that would require the first operator of the mining shovel to be alerted, the second operator may initiate a loading condition alert by pressing an actuator button. As shown at block 318, in response the second controller 292 causes an annunciation signal to be wirelessly transmitted. The transmitted annunciation signal is received by the first transceiver 246 as shown at block 320, and produces a signal at the input/output 254 that causes the first controller 256 to produce an annunciation signal at the output 260. The annunciation signal may be coupled to an acoustic annunciator, such as a buzzer, for alerting the first operator to the loading condition. The second operator may then confirm the loading condition by viewing the display 264. Alternatively, the first controller 256 may cause an alert to be displayed on the display 264.

Alternatively, should the first and second operation be in voice communication by two-way radio, as is often the case, the loading condition observed by the second operator may be communicated over the two-way radio. Where the first and second operators are not in direct two-way communication the alert may be relayed through the dispatch center 226 (shown in FIG. 4) where the dispatch center is in two-way voice communication with each of the first and second operators. Alternatively, the image signal generator 242 and the display signal generator 244 may be provided with two-way voice communication capability, either through the transceivers 246 and 280 or through separate transceivers.

Yet another alternative for alerting the first operator to the loading condition would be for the second operator to activate a horn provided on the haul truck to provide an acoustic annunciation of the alert.

In one embodiment the first and second transceivers 246 and 280 may be implemented as digital wireless nodes in a wireless local area network (WLAN), such as an IEEE 802.11 wireless local area network. The IEEE 802.11 standards allow for both peer-to-peer connection between nodes and for an infrastructure mode where the nodes communicate through an access point that may be wired or wireless. IEEE 802.11 also provides connection establishment protocols that could be used to implement or replace the process 300 shown in FIG. 6.

It should also be readily appreciated that the first and second transceivers 246 and 280 may each be implemented using separate transmitters and separate receivers in place of the respective transceivers. Furthermore, the image signal generator 242 may include an image signal transmitter for transmitting the image signal and a separate control signal transmitter for transmitting control signals. Similarly the display signal generator 244 may also include an image signal receiver for receiving the image signal and a separate control signal receiver for receiving control signals.

In general, the configuration of transmitters and receivers will be dependent on a selected signal transmission format. For example, the image signal transmission and reception may be implemented using wireless USB technology, which in some implementations provides for reception over distances of up to about 50 meters. Low cost wireless USB implementations and chips are commercially available.

Controller CPU

Figure 7:
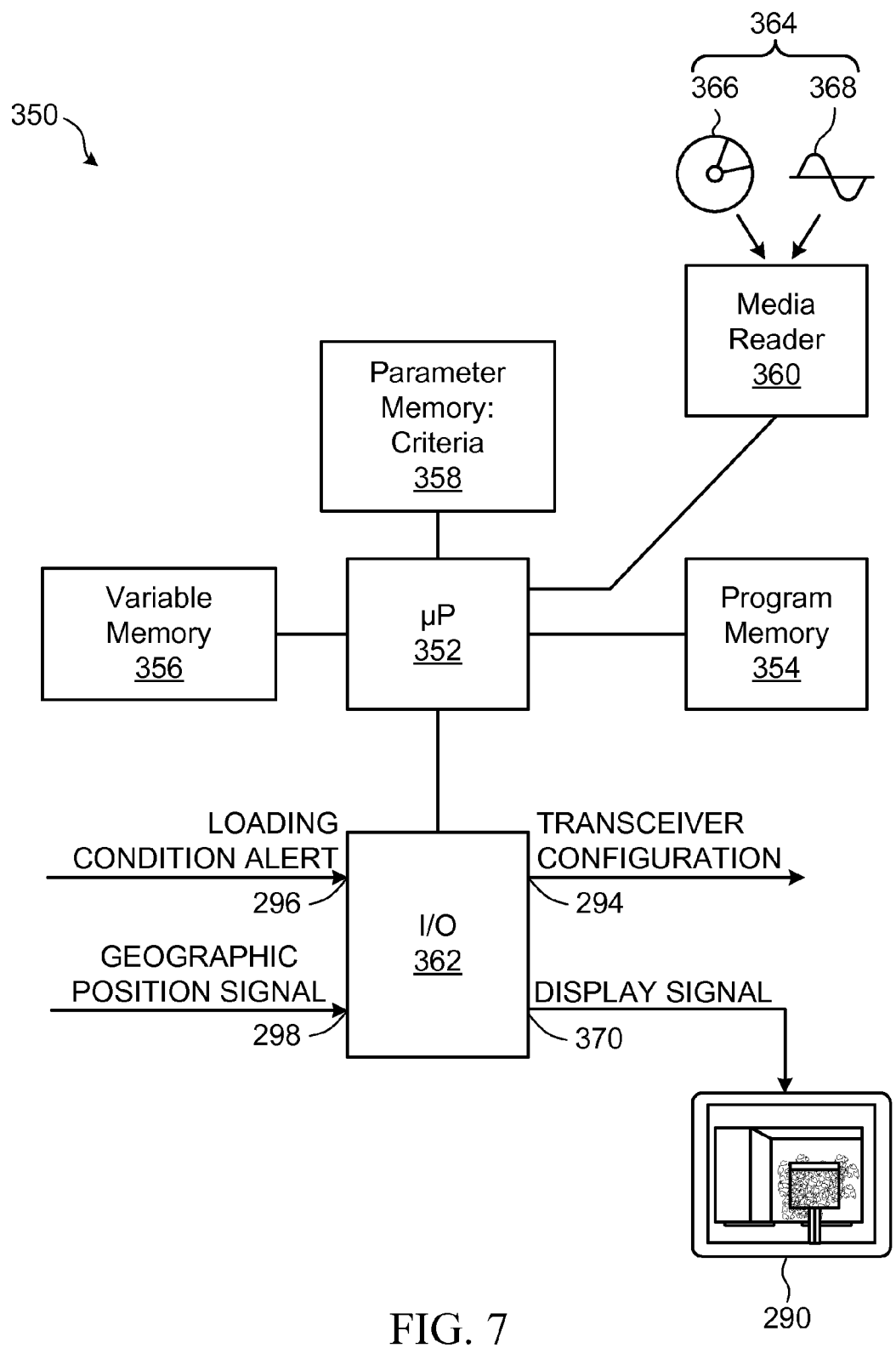
FIG. 7 is schematic view of a processor circuit for implementing a controller shown in FIG. 5.

Referring to FIG. 7, in one embodiment the second controller 292 may be implemented using a processing circuit shown generally at 350. The processor circuit 350 includes a microprocessor 352, a program memory 354, a variable memory 356, a parameter memory 358, a media reader 360 and an input/output port (I/O) 362, all of which are in communication with the microprocessor 352.

Program codes for directing the microprocessor 352 to carry out various functions are stored in the program memory 354, which may be implemented as a random access memory (RAM) and/or a hard disk drive (HDD), or a combination thereof.

The media reader 360 facilitates loading program codes into the program memory 354 from a computer readable medium 364, such as a CD ROM disk 366, or a computer readable signal 368, such as may be received over a network, which may be implemented in the vehicle, for example.

The I/O 362 includes the output 294 for producing the configuration signal for configuring the second transceiver 280. The I/O 362 further includes the input 296 for receiving the loading condition alert, and the input 298 (if used) for receiving the geographic position signal from the GPS receiver 299. In this embodiment, the I/O 362 includes an output 370 for directly producing a display signal for driving the display 290.

The variable memory 356 includes a plurality of storage locations for storing program operating data. The variable memory 356 may be implemented in random access memory, for example.

The parameter memory 358 includes a plurality of storage locations for storing various criteria, as will be described later herein. The parameter memory 358 may be implemented in random access memory, for example.

Advantageously, the processor circuit 350 may be additionally configured to perform image processing on the received image signal to extract further useful data and/or loading condition information. For example, image processing of the image signal may be employed to automatically detect boulders or other payload portions that exceed a safe loading size. Image processing may also be used to determine the relative location of the load transfer container with respect to the load carrying container for producing an alert of a possible load imbalance condition resulting from transfer of the payload to an unsafe location of the load carrying container. Additionally, image processing may also be employed to detect the timing of payload transfer from the load transfer container to the load carrying container to provide the second operator with a visual or audible alert each time the payload is dumped.

Similarly, the first controller 256 may also be implemented using a processor circuit similar to the processor circuit 350 shown in FIG. 7. When the first and second controllers 256 and 292 are respectively implemented using processor circuits, the blocks shown in FIG. 6 generally represent blocks of code stored in the program memory 354 for directing the respective processor circuits to perform the process 300.

The processor circuit 250 shown in FIG. 7 may be implemented using discrete components for the microprocessor 352, the memories 354, 356, and 358, and the I/O 362. Alternatively, a single chip micro-controller may be used to provide some or all of the required functionality in a single device.

Employing GPS Position Information

In one embodiment the first controller 256 of the image signal generator 242 receives a position signal at the input 268 from the GPS receiver 270 and causes the first transceiver 246 to transmit a control signal including position information identifying a geographic position of the image signal generator (i.e. the mining shovel). The position information may be included in the control signal used for transmitting image signal transmission characteristics or may be separately transmitted.

Figure 8:
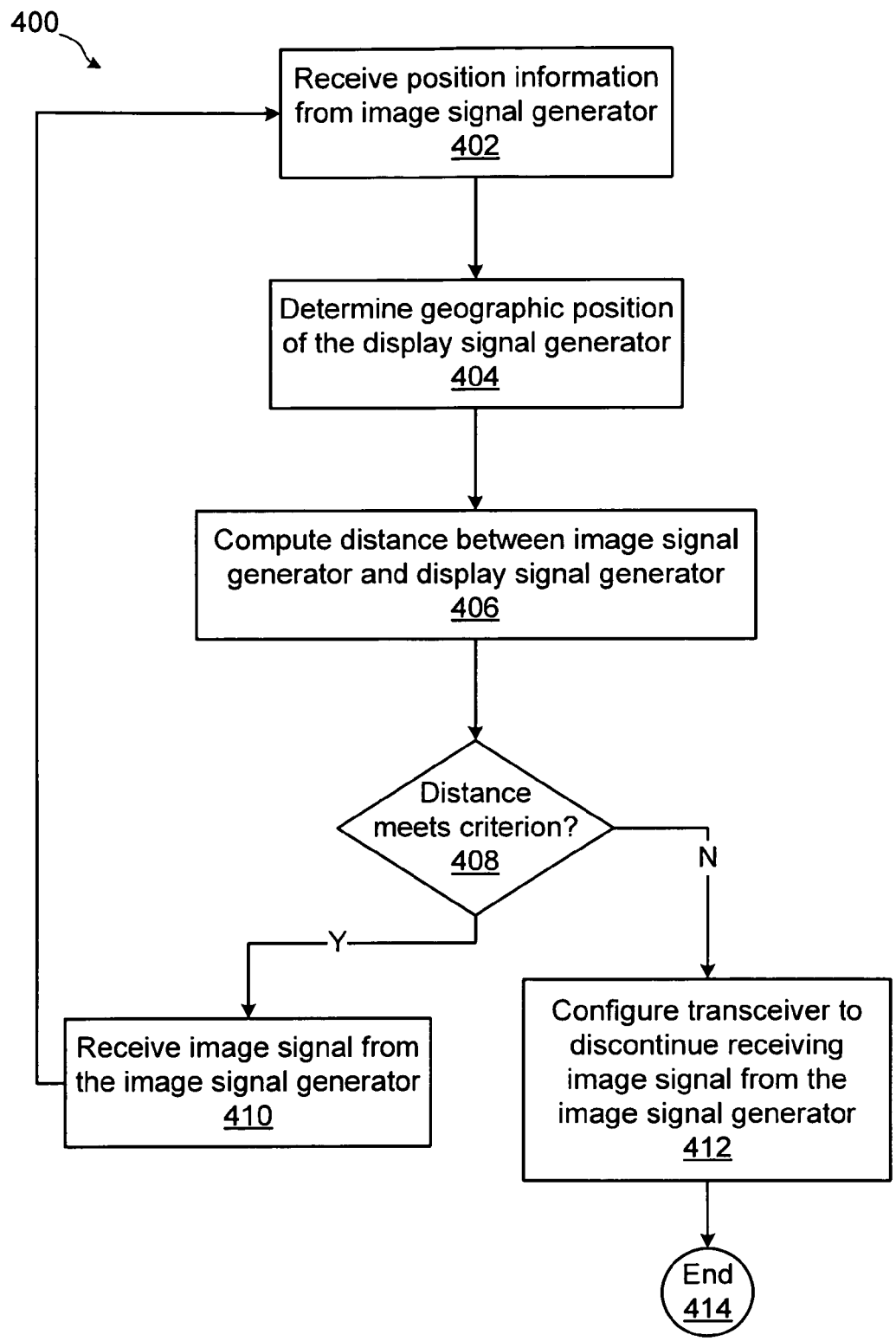
FIG. 8 is a flowchart including blocks of codes for directing the processor circuit shown in FIG. 7 to implement a second operational embodiment of the system shown in FIG. 5.

Referring to FIG. 8, in accordance with an alternative operational embodiment, a flowchart depicting blocks of code for directing the processor circuit 350 to establish communications between the image signal generator 242 and a display signal generator 244 is shown generally at 400. The process begins at block 402, which directs the microprocessor 352 to receive the control signal from the image signal generator 242 and to extract the geographic position information therefrom and the extracted values into the variable memory 356. Block 404 then directs the microprocessor 352 to determine the geographic position of the display signal generator 244 (i.e. the haul truck) and to write the position values to the variable memory 356.

Block 406 then directs the microprocessor to compute the distance between the saved values of the respective geographic positions of the mining shovel and the haul truck. The process then continues at block 408, which directs the microprocessor 352 to read a distance criterion from the parameter memory 358 and to determine whether the computed distance meets the distance criterion.

If the computed distance meets the distance criterion then the process continues at block 410, which directs the microprocessor 352 to receive the image signal from the image signal generator 242. If the image signal is already being received then no further action is performed at block 410 and reception continues. If the second transceiver 280 was not previously configured for receiving the image signal, then image signal transmission configuration characteristics are also extracted from the control signal as described above in connection with FIG. 6, and the second transceiver is configured accordingly for receiving the image signal.

Block 410 then directs the microprocessor 352 back to block 402 and the process 400 is repeated.

If at block 408, the computed distance does not meet the distance criterion then the process continues at block 412, which directs the microprocessor 352 to configure the second transceiver 280 to discontinue reception of the image signal.

The distance criterion may be a maximum distance from the image signal generator 242 on a mining shovel within which the display signal generator 244 on the haul truck should be configured to receive the image signal. Outside this maximum distance the display signal generator 244 drops reception of the image signal. Alternatively, to provide a smoother handoff, two distance criteria may be used, and where the haul truck should be configured to receive the image on entering a minimum distance and the display signal generator 244 drops reception of the image signal when passing outside of a maximum distance.

Referring back to FIG. 4, the previously referenced broken lines 228, 230, and 232 may be used to represent the maximum distance criterion for each of the respective mining shovels 210, 212 and 214. The haul truck 224 is outside the maximum distance and no longer receives image signals from the mining shovel 212, while the haul truck 220 is inside the maximum distance criterion and will have been configured for reception of the image signals. Other haul trucks 218 and 222 are within the maximum distance criteria 228 and 232 respectively, and will be configured to receive image signals from the mining shovels 210 and 214 respectively. The haul truck 216 is not yet inside any of the maximum distance criteria 228, 230 and 232 and will not be configured to receive image signals from any of the mining shovels 210, 212, or 214.

Advantageously, the use of GPS receivers in mining machines such as haul trucks and mining shovels is now widespread and as such, position information identifying current geographic coordinates of the vehicles may be readily available. The GPS position information may thus be used in pace of more complex negotiation processes or may be used to augment other communication establishment processes described herein. Differential GPS (dGPS) which uses a combination of satellite-based position information (i.e. regular GPS) & ground-based reference-position transmissions to increase resolution of location may also be used. Such dGPS systems require additional ground based equipment installed at the mine site (possibly at multiple locations).

Quality-of-Service

Figure 9:
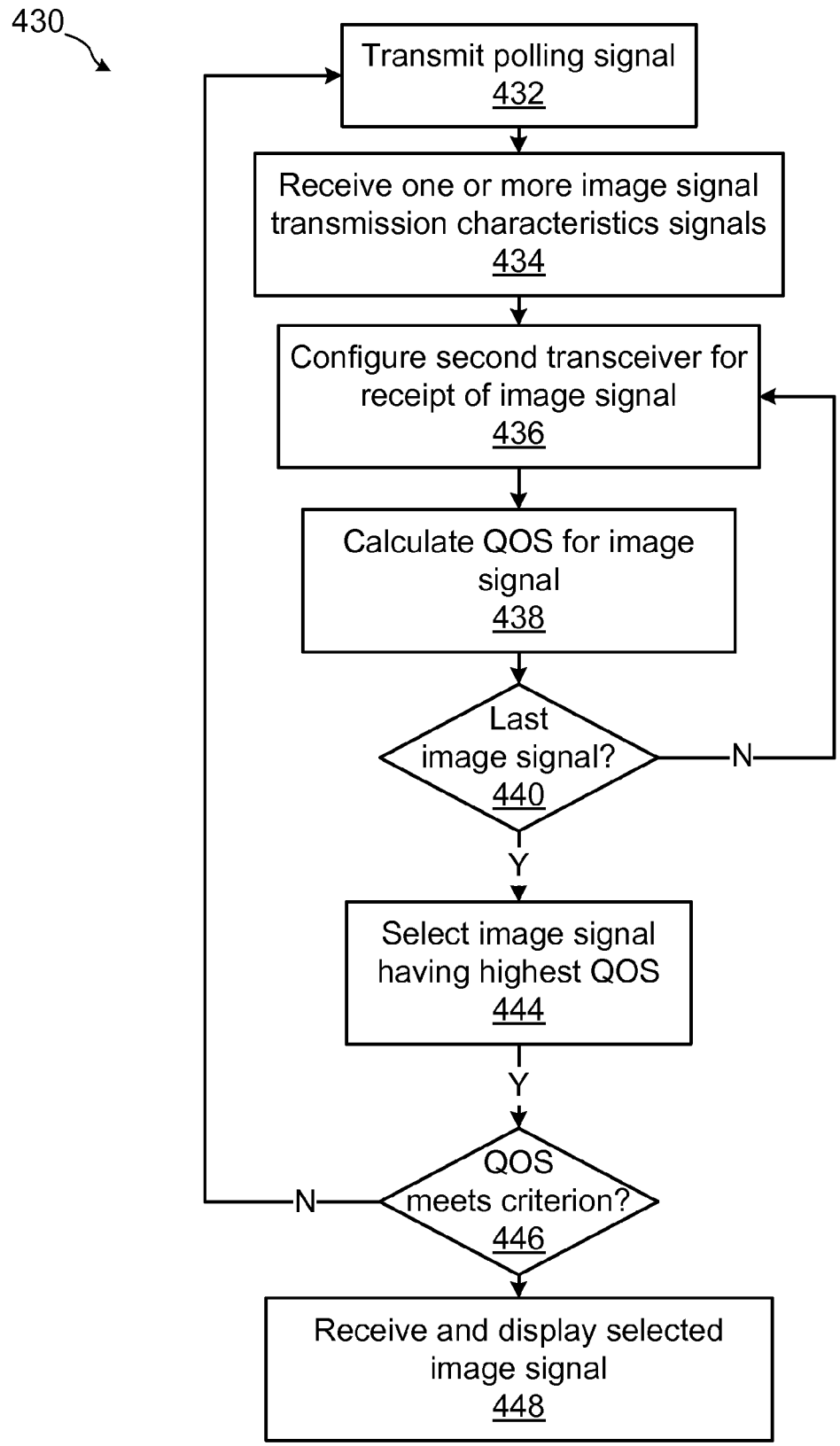
FIG. 9 is a flowchart including blocks of codes for directing the processor circuit shown in FIG. 7 to implement a third operational embodiment of the system shown in FIG. 5.

Referring to FIG. 9, in accordance with another operational embodiment, a flowchart depicting blocks of code for directing the processor circuit 350 to establish communications between the image signal generator 242 and the display signal generator 244 is shown generally at 430.

The process 430 includes steps in common with the process shown in FIG. 6. Block 432 directs the microprocessor 352 of the display signal generator 244 to transmit a pilot signal which notifies image signal processors in range that the display signal processor is ready to receive an image signal. Block 434 then directs the microprocessor 352 to cause the second transceiver 280 to receive image signal transmission characteristics from one or more image signal generators such as the image signal generator 242. The received image signal transmission characteristics signal also includes an identification identifying the transmitting image signal generator. Block 436 then directs the microprocessor 352 to configure the second transceiver 280 for receipt of the first image signal from a first image signal generator that responded to the pilot signal.

The process then continues at block 438, which directs the microprocessor 352 to calculate a Quality-of-Service (QOS) associated with the reception of the image signal. Calculating the QOS may involve determining one or more attributes associated with reception of the image signal, such as a measured signal strength, a data error rate, and the regularity of receipt of subsequent images (for example successive frames of a video signal). Other common QOS attributes may also be used and/or combined with the aforementioned attributes to produce a QOS value for the image signal reception. The QOS value and associated image signal generator identifier is then written to the variable memory 356.

Block 440 then directs the microprocessor 352 to determine whether all received responses to the pilot signal have been evaluated for QOS. If at block 440, all received responses to the pilot signal have not yet been evaluated, the microprocessor 352 is directed back to block 436 to repeat blocks 436 and 438 for the next received response to the pilot signal.

If at block 440 the last image signal has been evaluated, the process continues at block 444, which directs the microprocessor 352 to read the QOS values from variable memory 356 and to select the image signal corresponding to the image signal generator having the highest associated QOS.

Block 446 then directs the microprocessor 352 to determine whether the QOS value associated with the selected image signal meets a QOS criterion stored in the parameter memory 358. The QOS criterion may be a pre-determined minimum QOS for reliable reception of image signals. If the QOS associated with the image signal meets the OQS criterion, then the process continues at block 448, which directs the microprocessor 352 to display the selected image signal on the display 290. If the QOS associated with the image signal does not meet the OQS criterion, then block 446 directs the microprocessor 352 back to block 432 to recommence the process 430.

Advantageously, should more than one mining shovel be in range of a haul truck, an image signal transmission that offers highest QOS is selected for display by operating the system in accordance with the process 430. Additionally, should none of the mining shovels be sufficiently close to provide a minimum QOS, the process 430 is repeated until a suitable transmission is identified.

Figure 10:
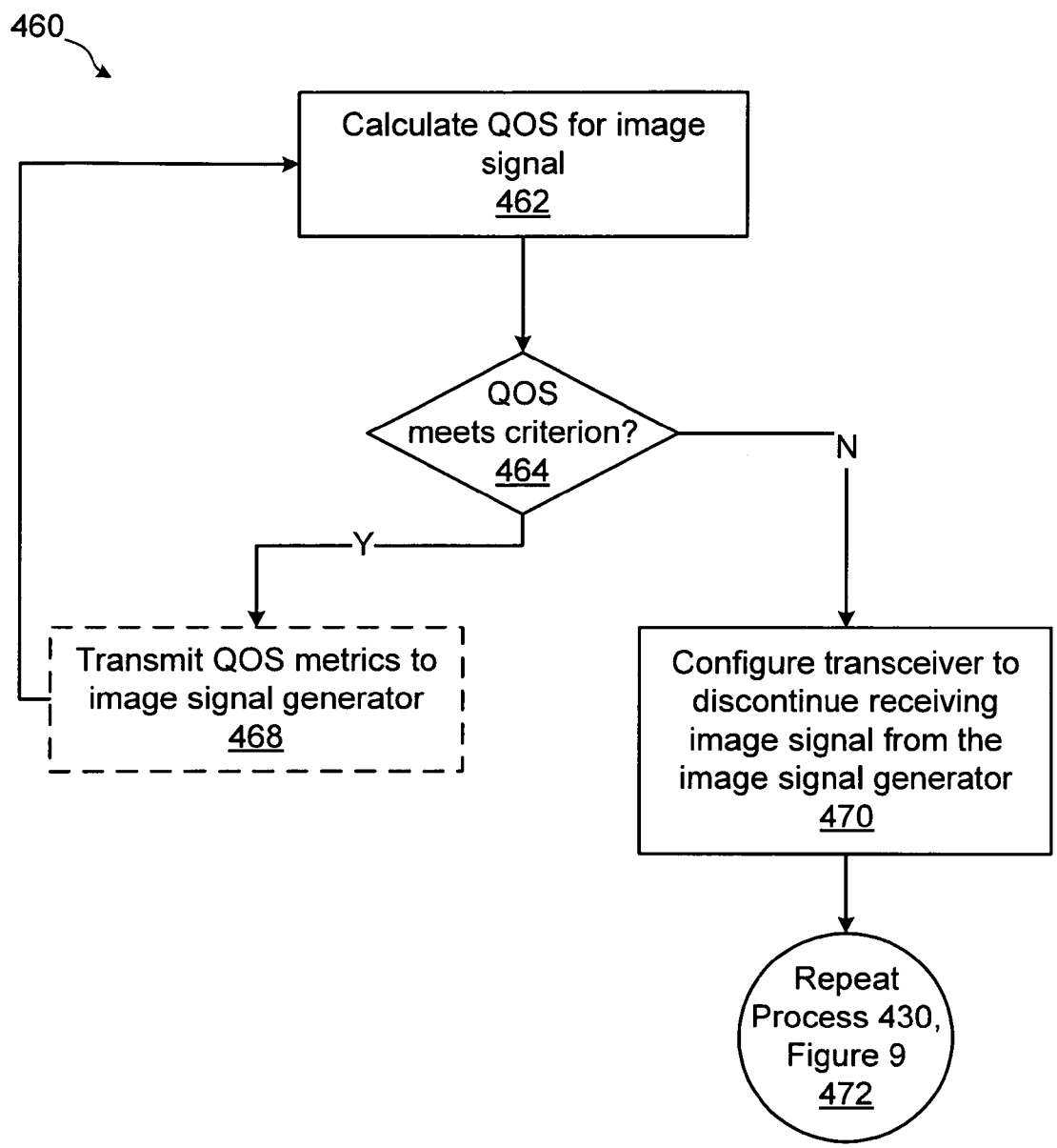
FIG. 10 is a flowchart including blocks of codes for directing the processor circuit shown in FIG. 7 to implement a fourth operational embodiment of the system shown in FIG. 5.

Referring to FIG. 10, the system 240 shown in FIG. 5 may continue to monitor QOS in accordance with another operational embodiment, as shown generally at 460. The process 460 begins at block 462, which directs the microprocessor 352 to calculate the QOS for the image signal currently being received and store the QOS value in the variable memory 356.

Block 464 then directs the microprocessor 352 to compare the QOS stored in the variable memory 356 with the QOS criterion stored in the parameter memory 358. If the QOS value for the image reception meets the QOS criterion, then the process continues at block 468, which optionally directs the microprocessor 352 to transmit the QOS value back to the transmitting image signal generator. Block 468 then directs the microprocessor 352 back to block 462 to re-evaluate QOS.

If at block 464, the QOS value for the image reception does not meet the QOS criterion, then the process continues at block 470, which directs the microprocessor 352 to discontinue reception of the image signal. The process then ends at block 472 which directs the microprocessor 352 to repeat the process 430 shown in FIG. 9.

Advantageously, the process 460 provides for ongoing monitoring of the QOS of the currently received image signal, and causes the reception to be dropped in the event of a degradation of reception below the minimum QOS criterion. Alternatively, or additionally, the second operator may be permitted to select one of a plurality of image signals that meet the QOS criterion, or viewing of more than one image signal may be provided on a split screen display. Additionally, the processor circuit 350 may be configured to permit QOS-based channel selection process to be overridden by manual intervention by the operator of the haul truck.

Add-on Embodiment

Figure 11:
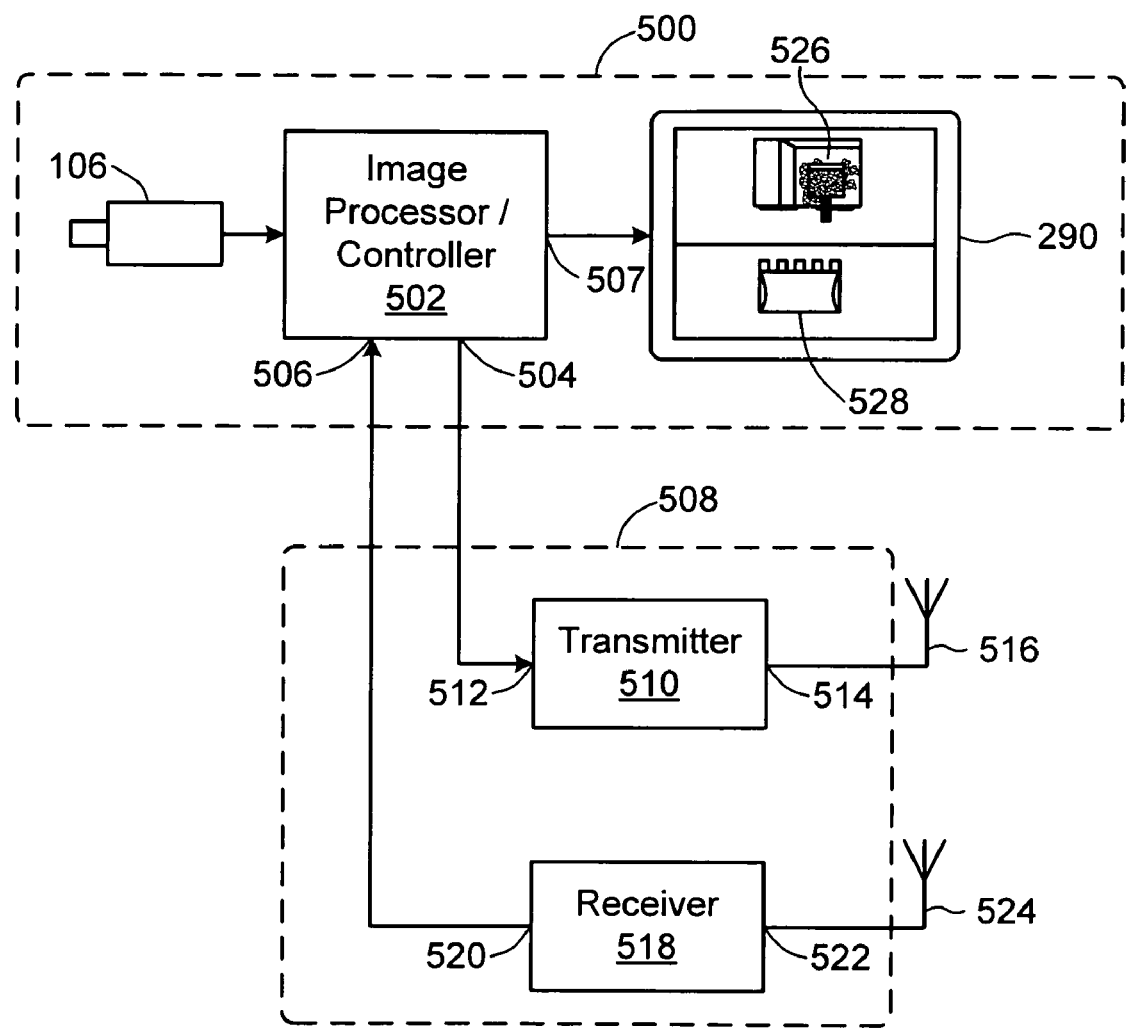
FIG. 11 is a block diagram of an image signal generator apparatus implemented as an add-on to an image processing system.

Referring to FIG. 11, in one embodiment the image signal generator may be implemented as an add-on to an existing image processing system 500. Advantageously, some mining shovels are already equipped with hardware that may be used to provide the images for transmission by the image signal generator. The image processing system 500 includes the camera 106, an image processor/controller 502, and the display 290. The display 290 is coupled to an output 507 of the image processor/controller 502, which produces signals for driving the display, such as VGA or composite video signals for example. The image processor/controller 502 also includes an output 504 for producing image and configuration signals and an input 506 for receiving control signals. The image processor/controller 502 may be implemented using a processor circuit, which permits reconfiguration to provide some of the functionality required to implement the image signal processor.

An add-on module is shown generally at 508. The add-on module includes a transmitter 510 having an input 512 in communication with the image processing system output 504 for receiving an image signal and configuration signals. The transmitter 510 also includes an antenna port 514 for connecting an antenna 516.

The add-on module further includes a receiver 518 having a control signal output 520 in communication with the input 506 of the image processing system 500. The add-on module also includes an antenna port 522 for connecting an antenna 524.

The transmitter 510 and receiver 518 may be operated generally in accordance with the embodiments described above and may be used to transmit both image signals and control signals if required. In one operational embodiment the image processor/controller 502 receives unprocessed image data or signals from the camera 106 makes these signals available at the output 504 for coupling to the transmitter 510.

In an alternative embodiment, signals produced at the output 507 of the image processor/controller 502 may be coupled to the input 512 of the transmitter 510, either directly or through a converter (not shown) that converts the VGA or composite signals into suitable video signals for driving the transmitter.

In other embodiments, the image processor/controller 502 may produce a split screen view on the display 290 showing both an unprocessed view of the loading operation 526 and an image processed view 528 including metrics associated with the payload and/or loading operation. The metrics may be produced by systems such the "ToothMetrics™" system described earlier. In this alternative embodiment, the image processor/controller 502 may be configured to provide image data or signals at the output 504 that represent at least one of the screen portions 526 and 528 displayed on the display 290 for transmission by the transmitter 510. The transmitted image signal may be received by any of the display signal generator embodiments described herein, thereby producing a view of at least a portion of the same screen provided for viewing by first operator.

Image Processing Embodiment

Figure 12:
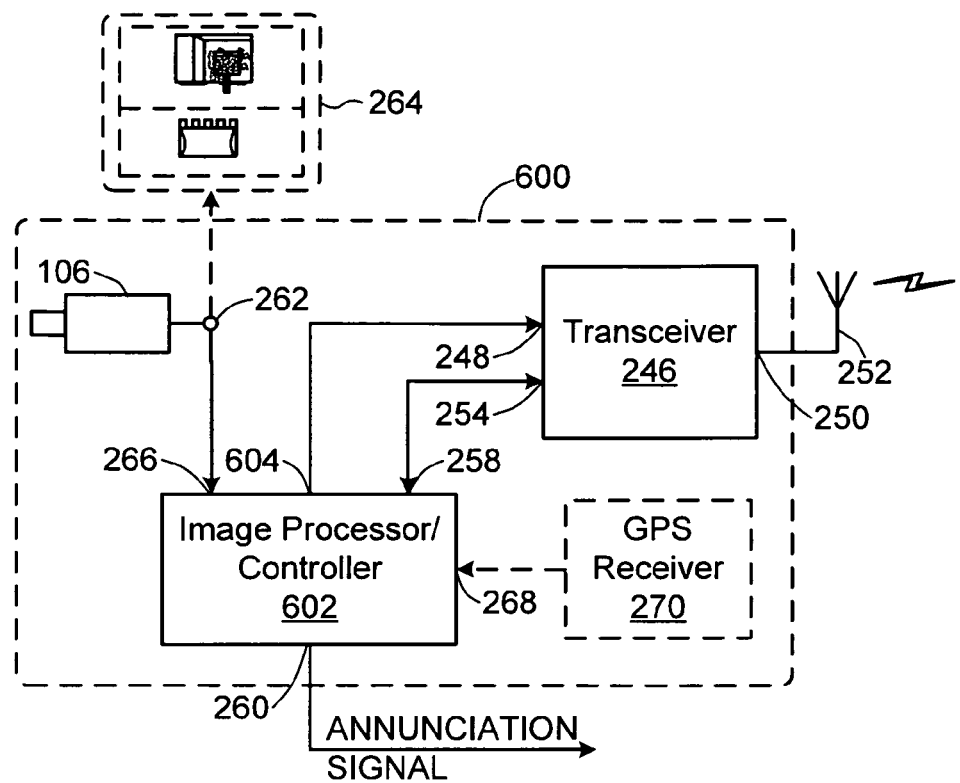
FIG. 12 is a block diagram of an image signal generator apparatus in accordance with an alternative embodiment of the invention.

In an alternative embodiment, either or both of the controllers 256 and 292 shown in FIG. 5 may be configured to provide image-processing functions. Referring to FIG. 12, an alternative image signal generator 600 includes a camera 106, first transceiver 246, and optional GPS receiver 270 as described above in connection with FIG. 5. In this embodiment, the image signal generator 600 includes a controller 602 that is capable of implementing image processing functions. The image processor/controller 602 includes the input 266 for receiving the image signal directly from the camera 106, and further includes an output 604 for producing a modified version of the image signals generated by the camera 106. The input 248 of the transceiver 246 is coupled to the output 604, and the transceiver thus receives the modified image signal from the image processor/controller 602 and transmits the modified image signal.

The image processor/controller 602 may perform various image processing tasks such as mirroring or flipping the image received from the camera 106 to provide a display that is more meaningful to the second operator 116. The image processor/controller 602 may also be configured to display overlay guide lines or highlighting of obstacles for guiding the truck around an obstacle, for example.

Figure 13:
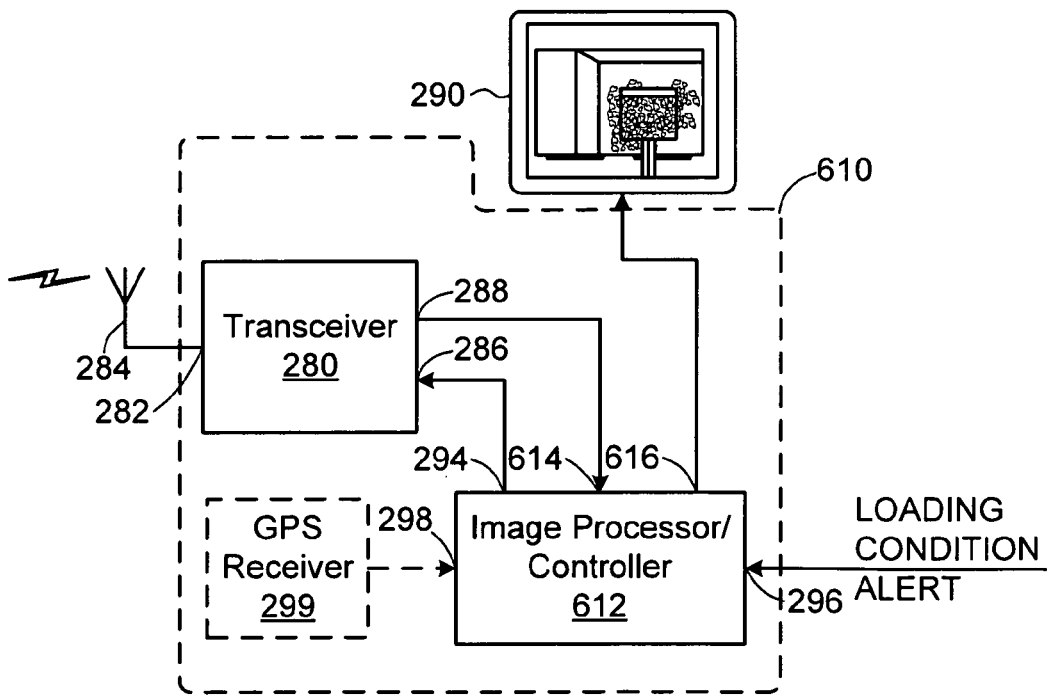
FIG. 13 is a block diagram of a display signal generator in accordance with an alternative embodiment of the invention.

Referring to FIG. 13, an alternative display signal generator 610 includes the second transceiver 280 and optional GPS receiver 299 as described above in connection with FIG. 5. In this embodiment however, the display signal generator 610 includes a controller 612 that is capable of implementing image processing functions. The image processor/controller 612 includes an input 614 for receiving the image signal directly from the output 288 of the transceiver, and further includes an output 616 for producing a modified version of the image signals received from the second transceiver. The modified image signal output 616 is coupled to the display 290, which receives and displays the modified image signal.

As described above in connection with the image signal generator 600, the image processor/controller 612 of the display signal generator 610 may perform various image processing tasks such as mirroring or flipping of the image, displaying of overlay guide lines or highlighting, for example.

Generally the above hardware and operating embodiments of the invention all provide for display of still or video images of load-transfer container operations by operators who are not necessarily directly involved in operating the load transfer container. The generation and wireless transmission of the image signals facilitates easy establishment of the communications link between the image signal generator associated with the load transfer container and the display signal generator.

While specific embodiments of the invention have been described and illustrated, such embodiments should be considered illustrative of the invention only and not as limiting the invention.

What is claimed is:

1. An image signal generator apparatus for producing an image signal to facilitate monitoring of loading of a payload into a load carrying container, the apparatus comprising:
   a camera operably configured to acquire at least one image of a load transfer container during operation of said load transfer container by a first operator to load the payload into the load carrying container;
   an image signal transmitter operably configured to wirelessly transmit an image signal representing said at least one image to permit reception and display of said at least one image for viewing by a second operator to facilitate monitoring of the loading of the payload by said second operator;
   a control signal transmitter; and
   a controller operably configured to:
      receive a position signal, said position signal indicating a location of the load carrying container;
      determine a location of said load transfer container; and
      cause said control signal transmitter to transmit a control signal encoded with configuration information for configuring a receiver associated with the load carrying container to receive said image signal when a distance between the load carrying container and said load transfer container meets a criterion;
   wherein said image signal has first transmission characteristics for preventing interference with a second image signal produced by a second load transfer container having second transmission characteristics and wherein said control signal is encoded with information representing said first transmission characteristics for configuring the receiver associated with the load carrying container to receive said image signal.

2. The apparatus of claim 1 further comprising a receiver operably configured to receive an annunciation alerting said first operator to a loading condition observed by said second operator.

3. The apparatus of claim 2 wherein said receiver is operably configured to receive a wirelessly transmitted annunciation of said loading condition.

4. The apparatus of claim 3 wherein said receiver is operably configured to receive an annunciation signal at a receiver associated with said load transfer container, said annunciation signal being produced in response to a vocal alert uttered by said second operator.

5. The apparatus of claim 4 wherein said receiver is operably configured to receive a relayed annunciation signal from a dispatch center.

6. The apparatus of claim 2 wherein said receiver is operably configured to receive an annunciation of at least one of:
a structural condition of said load transfer container;
a hazard associated with the loading of the payload into the load carrying container;
an indication that a payload portion in said load transfer container exceeds a safe loading size;
an indication that a payload portion in said load transfer container includes undesired materials or detritus;
an indication of a non-uniform loading condition occurring in the load carrying container; and
an indication that the loading operation should be discontinued.

7. The apparatus of claim 1 wherein said camera is operably configured to acquire a plurality of video frames representing real time movements of said load transfer container.

8. The apparatus of claim 7 wherein said camera is operably configured to have a field of view within which at least a portion of the load transfer container and at least a portion of the load carrying container is observable.

9. The apparatus of claim 1 wherein said image signal transmitter is operably configured to transmit one of:
a video signal including a plurality of video frames representing real time movements of said load transfer container;
a plurality of image signals, each of said plurality of image signals representing a still image of one of a plurality of a discrete states occurring during the loading operation; and
a screen image signal representing a copy of a screen image produced and displayed on a display associated with said load transfer container.

10. The apparatus of claim 1 wherein said image signal transmitter is operably configured to transmit an image signal having transmission characteristics that limit reception of said image signal within a pre-determined radius from said load transfer container.

11. The apparatus of claim 1 wherein said image signal transmitter is operably configured to transmit a first analog image signal having frequencies within a first frequency band, and wherein said second image signal comprises a second analog image signal having frequencies within a second frequency band.

12. The apparatus of claim 1 wherein said image signal transmitter is configurable to act as said control signal transmitter.

13. The apparatus of claim 1, wherein said first controller is operably configured to produce said position signal.

14. The apparatus of claim 13 further comprising a global positioning system (GPS) receiver operably configured to produce said position signal in response to receiving GPS satellite signals.

15. The apparatus of claim 1 wherein said control signal transmitter is operably configured to transmit a control signal including channel information identifying a channel for transmitting said image signal.

16. A system for monitoring loading of a payload into a load carrying container, the system comprising the image signal generator of claim 1 and further comprising:
a display signal generator operably configured to receive said image signal and to produce a display signal for causing said at least one image to be displayed for viewing by a second operator to facilitate monitoring of the loading of the payload.

17. The apparatus of claim 1 wherein the image signal generator comprises a first image signal generator and further comprising a second image signal generator for producing an image signal to facilitate monitoring a location of a load carrying container with respect to an obstacle, the second image signal generator comprising:
a camera located proximate the obstacle and operably configured to acquire at least one image of a terrain surrounding the obstacle; and
an image signal transmitter operably configured to wirelessly transmit an image signal representing said at least one image to permit reception and display of said at least one image for viewing by an operator to facilitate monitoring of a location of the load carrying container relative to the obstacle.

18. A system for monitoring loading of a payload into a load carrying container, the system comprising:
an image signal transmitter apparatus for use with an image signal processing system, the image signal processing system including a camera operably configured to acquire at least one image of a load transfer container during operation of said load transfer container by a first operator to load a payload into the load carrying container, the image signal processing system having an image signal output for producing an image signal, the image signal transmitter apparatus comprising an input for receiving said image signal from said image signal output, said image signal transmitter being operably configured to wirelessly transmit:
a control signal encoded with information representing first transmission characteristics of said image signal and a location of said load transfer container; and
an image signal representing said at least one image;
a display signal generator comprising an image signal receiver operably configured to wirelessly receive the image signal representing said at least one image of the load transfer container, said image signal receiver being operably configured to produce a display signal for causing said at least one image to be displayed for viewing by the second operator to facilitate monitoring of the loading of the payload, said display signal generator comprising:
a control signal receiver for receiving said control signal;
a controller operably configured to:
determine a location of the load carrying container; and
cause said image signal receiver to be configured to receive said image signal in accordance with said first transmission characteristics when a distance between the load carrying container and said load transfer container meets a criterion.

19. The apparatus of claim 18 further comprising an annunciation signal transmitter operably configured to cause a loading condition observed by said second operator to be wirelessly transmitted for alerting said first operator to said loading condition.

20. The apparatus of claim 19 wherein said annunciation signal transmitter is operably configured to wirelessly transmit an annunciation signal produced in response to a vocal alert uttered by said second operator.

21. The apparatus of claim 19 wherein said annunciation signal transmitter is operably configured to transmit an annunciation of at least one of:
   a structural condition of said load transfer container;
   a hazard associated with the loading of the payload into the load carrying container;
   an indication that a payload portion in said load transfer container exceeds a safe loading size; and
   an indication of a non-uniform loading condition occurring in the load carrying container.

22. The apparatus of claim 18 wherein said second operator is located in a compartment of the load carrying container, and wherein the load carrying container further comprises a display mounted in said compartment, said display being operably configured to cause said at least one image to be displayed on said display in response to receiving said display signal.

23. The apparatus of claim 18 wherein said image signal receiver comprises a wireless interface of a portable display device.

24. The apparatus of claim 18 wherein said image signal receiver is operably configured to receive one of:
   a video signal including a plurality of video frames representing real time movements of said load transfer container;
   a plurality of image signals, each of said plurality of image signals representing a still image of one of a plurality of a discrete states occurring during the loading operation; and
   a screen image signal representing a copy of a screen image produced and displayed on a display associated with said load transfer container.

25. The apparatus of claim 18 wherein said image signal receiver is operably configured to act as said control signal receiver.

26. The apparatus of claim 18 wherein said control signal receiver is operably configured to receive a plurality of control signals, each control signal including an identification of one of a plurality of load transfer containers, and wherein said controller is operably configured to cause said second operator to be prompted to select one of said plurality of load transfer containers for monitoring.

27. The apparatus of claim 18 further comprising a global positioning system (GPS) receiver operably configured to produce a position signal representing said location of the load carrying container in response to receiving GPS satellite signals.

28. A system for monitoring loading of a payload into a load carrying container, the system comprising:
   an image signal transmitter apparatus for use with an image signal processing system, the image signal processing system including a camera operably configured to acquire at least one image of a load transfer container during operation of said load transfer container by a first operator to load a payload into the load carrying container, the image signal processing system having an image signal output for producing an image signal, the image signal transmitter apparatus comprising an input for receiving said image signal from said image signal output, said image signal transmitter being operably configured to wirelessly transmit an image signal representing said at least one image;
   a display signal generator comprising an image signal receiver operably configured to wirelessly receive the image signal representing said at least one image of the load transfer container, said image signal receiver being operably configured to produce a display signal for causing said at least one image to be displayed for viewing by the second operator to facilitate monitoring of the loading of the payload, said display signal generator comprising a controller in communication with said image signal receiver, said controller being operably configured to:
      cause said image signal receiver to periodically attempt to establish a communications link with image signal transmitters in range of said first receiver, each image signal transmitter being associated with one of a plurality of load transfer containers; and
      select one of said image signal transmitters for receiving said image signal when a communications link between said one of said transmitters meets a quality-of-service criterion.

29. The apparatus of claim 28 wherein said controller is operably configured to monitor said quality-of-service while receiving said image signal and to discontinue said receiving in response to said quality-of-service falling below said quality-of-service criterion.

30. The apparatus of claim 29 wherein said controller is operably configured to select another one of said transmitters for receiving said image signal when a communications link between said one of said transmitters meets said quality-of-service criterion.

31. The apparatus of claim 28 further comprising an annunciation signal transmitter operably configured to cause a loading condition observed by said second operator to be wirelessly transmitted for alerting said first operator to said loading condition.

32. The apparatus of claim 31 wherein said annunciation signal transmitter is operably configured to wirelessly transmit an annunciation signal produced in response to a vocal alert uttered by said second operator.

33. The apparatus of claim 31 wherein said annunciation signal transmitter is operably configured to transmit an annunciation of at least one of:
   a structural condition of said load transfer container;
   a hazard associated with the loading of the payload into the load carrying container;
   an indication that a payload portion in said load transfer container exceeds a safe loading size; and
   an indication of a non-uniform loading condition occurring in the load carrying container.

34. The apparatus of claim 28 wherein said second operator is located in a compartment of the load carrying container, and wherein the load carrying container further comprises a display mounted in said compartment, said display being operably configured to cause said at least one image to be displayed on said display in response to receiving said display signal.

35. The apparatus of claim 28 wherein said image signal receiver comprises a wireless interface of a portable display device.

36. The apparatus of claim 28 wherein said image signal receiver is operably configured to receive one of:

a video signal including a plurality of video frames representing real time movements of said load transfer container;

a plurality of image signals, each of said plurality of image signals representing a still image of one of a plurality of a discrete states occurring during the loading operation; and a screen image signal representing a copy of a screen image produced and displayed on a display associated with said load transfer container.

37. The apparatus of claim 28 wherein said image signal receiver is operably configured to receive a plurality of image signals and to select one of said plurality of image signals having transmission characteristics that provide a best quality-of-service.

* * * * *